(12) United States Patent
Lee et al.

(10) Patent No.: US 9,143,210 B1
(45) Date of Patent: Sep. 22, 2015

(54) SOFT SPHERE DECODER FOR MIMO MAXIMUM LIKELIHOOD DEMODULATION

(71) Applicant: Marvell International Ltd., Hamilton (BM)

(72) Inventors: Jungwon Lee, San Diego, CA (US); Jiwoong Choi, Santa Clara, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/050,115

(22) Filed: Oct. 9, 2013

Related U.S. Application Data

(63) Continuation of application No. 12/891,377, filed on Sep. 27, 2010, now Pat. No. 8,559,543.

(60) Provisional application No. 61/250,147, filed on Oct. 9, 2009.

(51) Int. Cl.
  *H04L 27/06* (2006.01)
  *H04B 7/04* (2006.01)

(52) U.S. Cl.
  CPC .................................... *H04B 7/0413* (2013.01)

(58) Field of Classification Search
  None
  See application file for complete search history.

(56) References Cited

U.S. PATENT DOCUMENTS

| 7,397,843 | B2 | 7/2008 | Grant et al. |
| 7,782,971 | B2 | 8/2010 | Burg et al. |
| 7,782,984 | B2 | 8/2010 | Garrett |
| 7,809,071 | B2 | 10/2010 | Kajihara |
| 8,027,404 | B1 | 9/2011 | Amiri et al. |
| 8,042,031 | B2 | 10/2011 | Chen et al. |
| 8,160,182 | B2 | 4/2012 | Chen et al. |
| 8,279,954 | B2 | 10/2012 | Papadopoulos et al. |
| 8,290,096 | B2 | 10/2012 | Shim et al. |
| 2007/0116143 | A1 | 5/2007 | Bjerke et al. |
| 2008/0095281 | A1 | 4/2008 | Hosur et al. |
| 2008/0279298 | A1 | 11/2008 | Ben-Yishai et al. |
| 2009/0154600 | A1 | 6/2009 | Kim et al. |
| 2009/0213954 | A1 | 8/2009 | Bursalioglu et al. |
| 2009/0257530 | A1 | 10/2009 | Shim et al. |
| 2009/0304114 | A1 | 12/2009 | Burg |
| 2010/0054372 | A1 | 3/2010 | Eckert |
| 2010/0183065 | A1* | 7/2010 | Siti et al. ........................ 375/233 |
| 2010/0254446 | A1 | 10/2010 | Khayrallah et al. |
| 2010/0329395 | A1* | 12/2010 | Kang et al. .................... 375/341 |
| 2011/0122004 | A1 | 5/2011 | Rekaya-Ben Othman et al. |
| 2011/0182336 | A1* | 7/2011 | Chin et al. .................... 375/224 |

OTHER PUBLICATIONS

Byonghyo Shim and Insung Kang, "Sphere Decoding With a Probablistic Tree Pruning," IEEE Transactions on Singal Processing, 56:10(4867-78), Oct. 2008.

* cited by examiner

*Primary Examiner* — Adolf Dsouza

(57) ABSTRACT

Methods and apparatus are provided for soft-decision maximum likelihood demodulation to decode a data vector transmitted in a multiple-input multiple-output (MIMO) communications channel. Soft-decision demodulators are disclosed that implement sphere decoding to reduce complexity of demodulation while preserving optimal performance. Candidate signal values associated with the transmitted data vector may be obtained and partitioned into signal bit groups. A sphere search may be performed over the candidate signal values within a search radius value to determine a smallest distance metric for each signal bit group. The search radius value may be updated based on a current smallest distance metric for each signal bit group. A log-likelihood ratio (LLR) may be computed from the determined smallest distance metrics for each signal bit group using a soft-decision demodulator.

20 Claims, 17 Drawing Sheets

US 9,143,210 B1

SOFT SPHERE DECODER FOR MIMO MAXIMUM LIKELIHOOD DEMODULATION

CROSS-REFERENCE TO RELATED APPLICATION

This application is a continuation of U.S. patent application Ser. No. 12/891,377, filed Sep. 27, 2010 (now U.S. Pat. No. 8,559,543), which claims the benefit under 35 U.S.C. §119(e) of U.S. Provisional Application No. 61/250,147, filed Oct. 9, 2009, each of which is hereby incorporated herein by reference in its entirety.

BACKGROUND OF THE INVENTION

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted as prior art against the present disclosure.

This disclosure relates generally to signal detection, and more particularly to detecting signals received in a multiple-input multiple-output (MIMO) system by performing maximum likelihood demodulation using a soft sphere decoder.

With the continuing demand for higher-speed digital communications systems and higher-density digital storage systems, various techniques have been applied to increase the capacity of these systems. However, even with high-capacity communications and storage media, their respective bandwidths and densities are still limited. Therefore, MIMO systems are often used to fully exploit the capabilities of these systems. In particular, increasing the dimensions of these systems enables higher throughput and reliability, as more information can be conveyed without increasing the bandwidth of such systems.

However, the efficiency gained by MIMO systems comes at the expense of a complex receiver design. In particular, a MIMO receiver may obtain a plurality of signals from its multiple receiver inputs, where each signal includes information from each of the multiple transmitter outputs. From all of this jumbled information, a MIMO detector can attempt to recover the independent information transmitted from each of the various transmitter outputs. Thus, this information recovery process may require some tradeoff between receiver complexity and performance.

SUMMARY OF THE INVENTION

In accordance with the principles of the present disclosure, methods and apparatus are provided for soft-decision maximum likelihood demodulation to decode a data vector transmitted in a multiple-input multiple-output (MIMO) communications channel. Soft-decision demodulators are disclosed that implement sphere decoding to reduce the complexity of demodulation while preserving optimal performance.

In some embodiments, candidate signal values associated with a data vector transmitted in a MIMO communications channel may be obtained and partitioned into signal bit groups. A sphere search may be performed over the candidate signal values within a search radius value to determine a smallest distance metric for each signal bit group. The search radius value may be updated based on a current smallest distance metric for each signal bit group. A log-likelihood ratio (LLR) may be computed from the determined smallest distance metrics for each signal bit group using a soft-decision demodulator. The computed LLR may be used to decode the transmitted data vector (e.g., using decoder circuitry).

The following description of exemplary embodiments of the present disclosure provides illustration and description, but is not intended to be exhaustive or to limit the disclosure to the precise form disclosed. Modifications and variations are possible in light of the above teachings or may be acquired from practice of what is disclosed herein. While certain components of the present disclosure have been described as implemented in hardware and others in software, other configurations may be possible.

BRIEF DESCRIPTION OF THE FIGURES

The above and other aspects and advantages of the present disclosure will be apparent upon consideration of the following detailed description, taken in conjunction with the accompanying drawings, in which like reference characters refer to like parts throughout, and in which.

DETAILED DESCRIPTION OF THE INVENTION

Systems and methods are provided for soft-decision maximum likelihood demodulation to decode a data vector transmitted in a multiple-input multiple-output (MIMO) communications channel. Soft-decision demodulators are disclosed that implement sphere decoding to reduce the complexity of demodulation while preserving optimal performance. As used herein, "information" and "data" refer to any unit or aggregate of energy or signals that contain some meaning or usefulness. Information may be grouped into units of k symbols, where each symbol may be binary, ternary, quaternary, or any other suitable type of data. However, for simplicity, embodiments of the present disclosure will be described in terms of binary bits.

Figure 1:
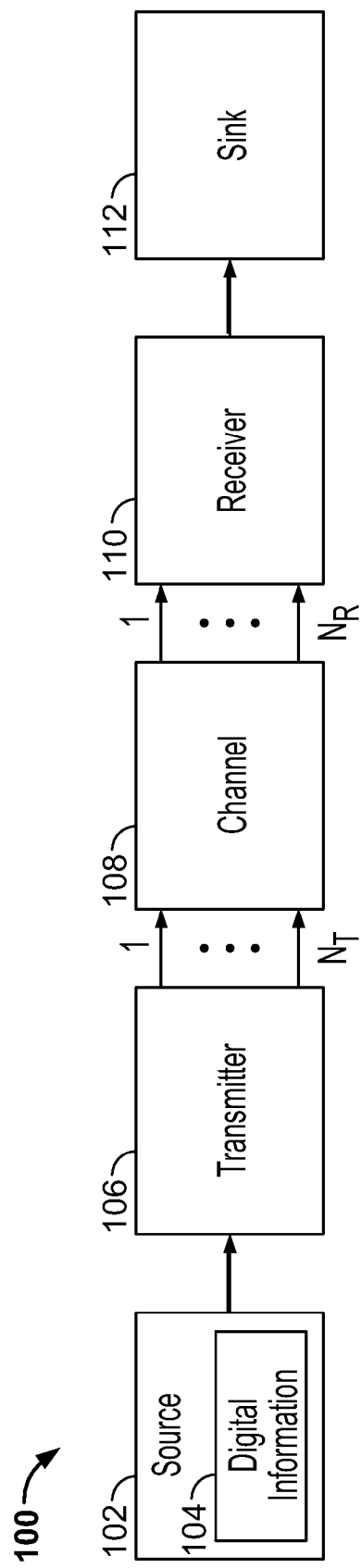
FIG. 1 shows a simplified illustrative multiple-input multiple-output (MIMO) digital communications or storage system in accordance with some embodiments.

FIG. 1 shows illustrative system 100 of a basic multiple-input multiple-output (MIMO) digital communications or storage system in accordance with some embodiments. System 100 includes source 102, transmitter 106, receiver 110, and sink 112. System 100 may convey information, including digital information 104, from source 102 to sink 112 using transmitter 106 and receiver 110. Digital information 104 may represent any type of information to be conveyed to sink 112, such as a sampled/quantized version of an analog signal or binary information. Digital information 104 may be provided or generated by source 102. Source 102 can be any suitable type of digital information source including, but not limited to, a source encoder, a magnetic storage device (e.g., a hard disk), an electrical storage device (e.g., FLASH memory or RAM), or an optical storage device (e.g., a CD-ROM).

The information transferred from source 102 to sink 112 may travel through some transmission or playback medium. This medium is illustrated as channel 108 in FIG. 1. Channel 108 can represent any transmission or storage medium or media, and can alter information being transmitted through it. Thus, transmitter 106 and receiver 110 can be used to accurately transmit and receive information through channel 108. In particular, transmitter 106 may convey digital information 102 in a manner appropriate for transmission through channel 108, and receiver 110 may interpret received information based on the properties of channel 108. Transmitter 106 can have a plurality of outputs for transmitting information and receiver 110 can have a plurality of inputs for receiving information. For simplicity, the variable, $N_T$, will hereinafter represent the number of transmit antennas, and the variable, $N_R$, will hereinafter represent the number of receive antennas. Thus, transmitter 106 can have antennas $1, \ldots, N_T$, and receiver 110 can have antennas $1, \ldots, N_R$. Transmitter 106 can transmit S spatial streams using the transmit antennas to the receive antennas of receiver 110. The number of spatial streams, S, is less than or equal to the smaller of $N_T$ and $N_R$.

It should be understood that the enumeration of transmitter outputs (e.g., $1, \ldots, N_T$) and receiver inputs (e.g., $1, \ldots, N_R$) are for convenience only, and are not meant to suggest a particular ordering of the outputs. For example, it should not be assumed that the numbering is based on a spatial orientation of the various inputs/outputs, or that the enumeration suggests a relative priority of the various inputs/outputs.

The received signal model of a basic MIMO digital communications system (e.g., system 100) may be represented as:

$$y = Hx + z \quad \text{(EQ. 1)}$$

where y is a received data vector, H is an effective channel matrix (e.g., that includes any precoding operations at the transmitter), x is a transmitted data symbol vector and z is a circularly symmetric complex Gaussian noise vector with a covariance matrix of $R_z = \sigma_z^2 I$. In system 100, vectors y and z have $N_R$ elements corresponding to the number of receive antennas, vector x has S elements, corresponding to the number of transmitted data streams, and channel matrix H has $N_R \times S$ elements, where each element $h_{r,s}$ of channel matrix H represents the channel gain from stream s to receive antenna r.

Figure 2:
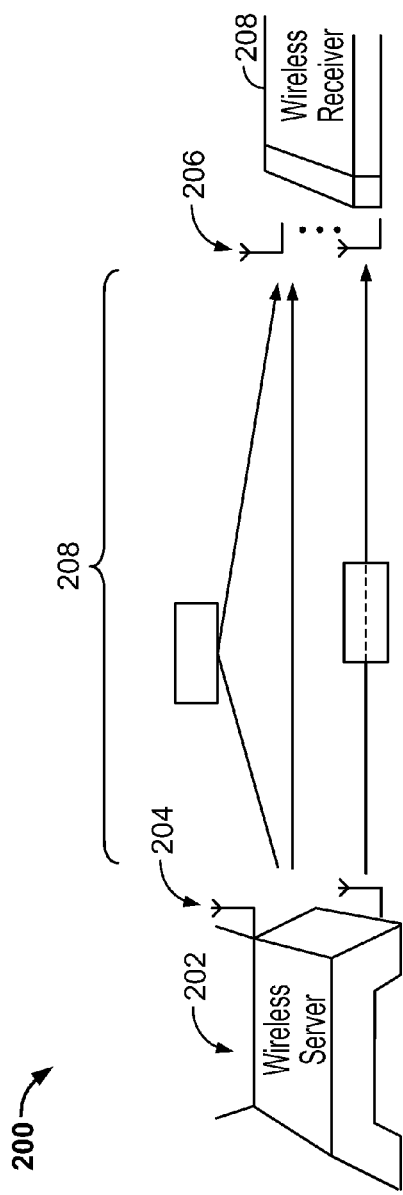
FIG. 2 shows an illustrative wireless communication system in accordance with some embodiments.

Referring now to FIG. 2, illustrative wireless communication system 200 is shown in accordance with some embodiments. Wireless system 200 may include any of the features and functionalities of the components in system 100 of FIG. 1. In some embodiments, wireless transmitter 202 may be a transmitter for broadcasting information wirelessly, such as a commercial gateway modem. Wireless transmitter 202 transmits information from a source using $N_T$ wireless antennas 204. Wireless receiver 206 can receive information wirelessly, and may be, for example, a commercial wireless computer adapter. Wireless receiver 206 can receive information transmitted from wireless transmitter 202 using $N_R$ receive antennas 206, and may receive this information from channel 208. Channel 208 may include the space between transmit antennas 204 and receive antennas 206, and may include any structures within the space that may obstruct and attenuate the transmitted signals. For example, channel 208 can alter the transmitted signals due to at least multipath fades and shadowing effects. The information may be transmitted over a single carrier signal or over multiple carrier signals. For example, wireless system 200 may be a Code Division Multiple Access (CDMA) system, a Wi-Fi system, a Worldwide Interoperability for Microwave Access (WiMax) system, a Long Term Evolution (LTE) system, or any other suitable MIMO system.

Figure 3:
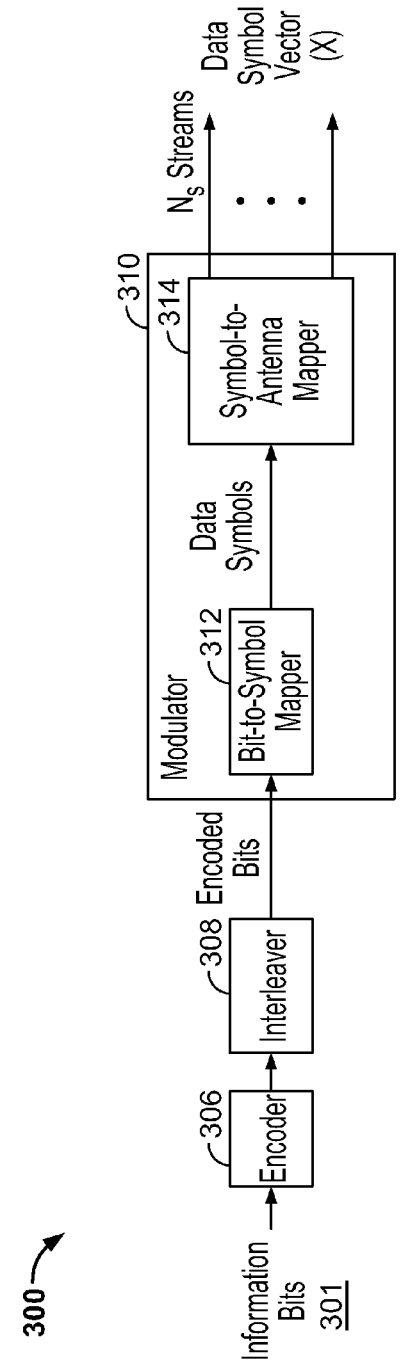
FIG. 3 shows an illustrative MIMO transmitter in accordance with some embodiments.

Referring now to FIG. 3, an illustrative block diagram is shown of transmitter 300 in accordance with some embodiments. Transmitter 300 may have any of the features and functionalities of transmitter 106 in FIG. 1. In some embodiments, transmitter 300 may be a wireless transmitter, such as those shown in FIG. 2. Transmitter 300 can include encoder 306, interleaver 308, and modulator 310. Encoder 306 may encode information bits 301 (e.g., digital information 104 of FIG. 1) based on any suitable error correcting or error detecting code. In some embodiments, encoder 306 may be a convolutional encoder, a Reed-Solomon encoder, or a CRC encoder. Encoder 306 may also implement an advanced encoding scheme such as convolutional turbo codes or low density parity check codes. Since encoder 306 may have a memory of k, each k consecutive bits in the encoded stream created by encoder 306 may depend on the value of the same information bits. In order to remove any adverse effects that may result from this dependency (e.g., the inability to reliably decode when burst errors are present), the encoded stream may also be interleaved by interleaver 308. In particular, interleaver 308 may change the order of the bits in the encoded stream to ensure that neighboring bits in the interleaved sequence are effectively independent of each other.

Transmitter 300 includes modulator 310 that includes bit-to-symbol mapper 312 and symbol-to-antenna mapper 314. Bit-to-symbol mapper 312 may be configured to convert the interleaved bits produced by interleaver 308 into symbols based on the size of a modulation scheme. Bit-to-symbol mapper 312 may use any suitable modulation scheme of any of a variety of sizes. For example, bit-to-symbol mapper 312 may utilize a quadrature amplitude modulation ("QAM")

scheme (e.g., 2 QAM, 4 QAM, 16 QAM, 32 QAM) and/or a phase shift keying ("PSK") modulation scheme (e.g., BPSK, QPSK, 16 PSK, 32 PSK). Symbol-to-antenna mapper 314 may then modulate the symbols into S streams to be transmitted by $N_T$ antennas. Collectively these streams are referred to as data signal x that consists of S data symbols.

Figure 4A:
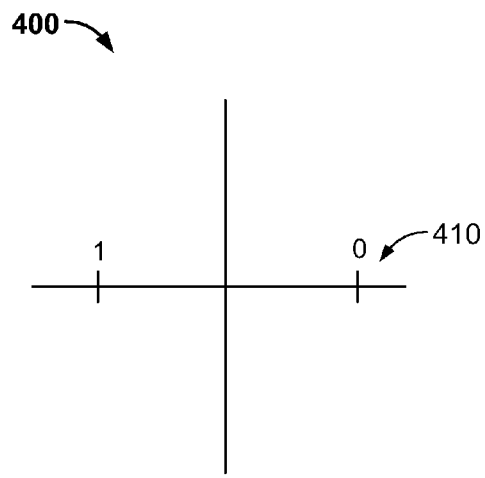
FIG. 4A shows an illustrative signal constellation set for a 2 QAM/BPSK modulation scheme in accordance with some embodiments.
Figure 4B:
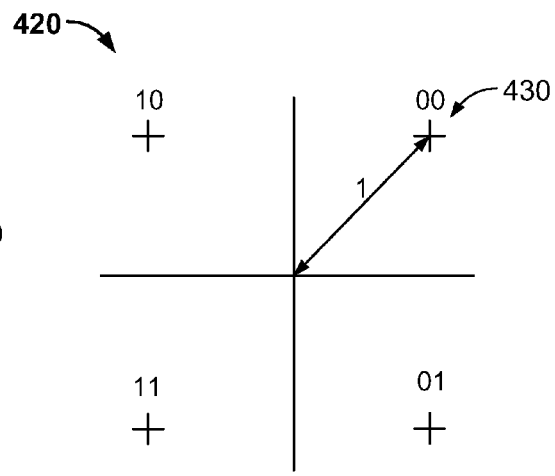
FIG. 4B shows an illustrative signal constellation set for a 4 QAM/QPSK modulation scheme in accordance with some embodiments.
Figure 4C:
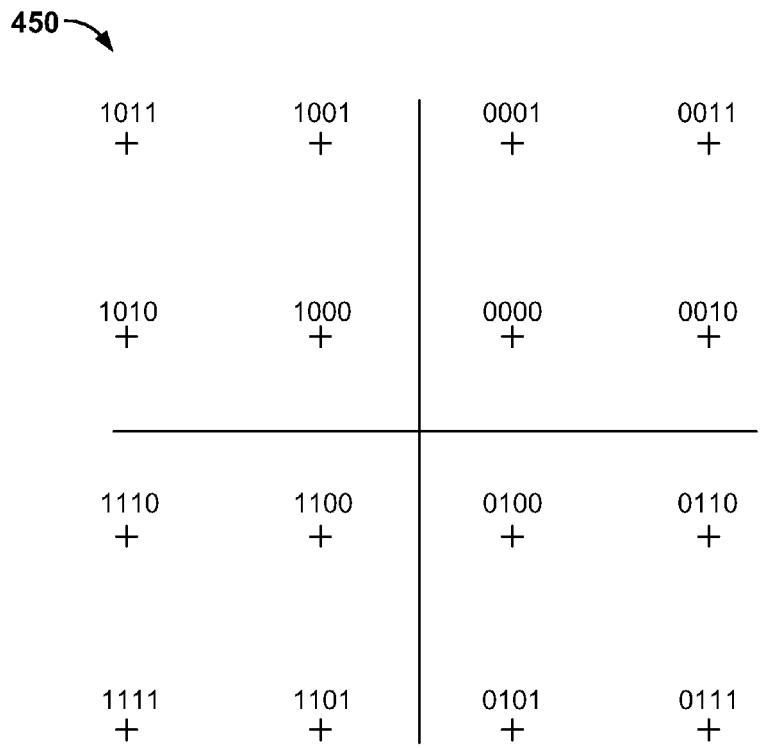
FIG. 4C shows an illustrative signal constellation set for a 16 QAM modulation scheme in accordance with some embodiments.

The modulation scheme used by modulator 310 may be associated with a signal constellation set that defines the magnitude and phase of a carrier signal that is transmitted for each possible symbol value. For example, FIG. 4A shows an illustrative signal constellation set 400 for a 2 QAM/BPSK modulation scheme, FIG. 4B shows an illustrative signal constellation set 420 for a 4 QAM/QPSK modulation system, and FIG. 4C shows an illustrative signal constellation set 450 for a 16 QAM modulation scheme. In these figures, the respective constellation sets are shown on a complex number plane, where each "+" represents a signal constellation point having a particular phase and magnitude. For example, referring to FIG. 4A, signal constellation point 410 has a magnitude of one and a phase of 0 degrees. Thus, when that signal constellation point is selected for transmission, modulator 310 may produce a radio signal that has a magnitude of one and a phase of 0 degrees. For example, referring to FIG. 4B, signal constellation point 430 has a magnitude of one and a phase of +45 degrees. Thus, when that signal constellation point is selected for transmission, modulator 310 may produce a radio signal that has a magnitude of one and a phase of +45 degrees.

Each signal constellation point in signal constellation sets 400, 420, and 450 is respectively associated with a particular 1-bit symbol, 2-bit symbol, and 4-bit symbol. The symbols in these respective constellation sets may be assigned to particular signal constellation points based on a Gray code mapping. A Gray code mapping maps neighboring signal points in the modulation scheme to symbols that differ in only one bit. For example, in FIG. 4B, the two signal points that correspond to symbols differing by two bits ("00" and "11") are not neighboring signal points. Gray code mapping therefore ensures that, even if a signal were mistaken for a neighboring signal point when decoded, the incorrectly decoded signal can be incorrect in only one bit.

Referring back to FIG. 3, modulator 310 can use any suitable one-dimensional or multi-dimensional modulation scheme, and therefore any suitable signal constellation set, for converting symbols to signals. For example, modulator 310 may modulate symbols according to the 16 QAM modulation scheme illustrated in FIG. 4C. In other embodiments, modulator 310 can modulate symbols based on phase shift keying (PSK), frequency shift keying (FSK), or any other suitable modulation scheme.

It should be understood that transmitter 300 of FIG. 3 is merely illustrative. In particular, any of the components of transmitter 300 may be modified, omitted, or rearranged, or any additional components may be added, without departing from the scope of the present disclosure. Furthermore, any of the components may be combined into a component with combined functionality.

Figure 5:
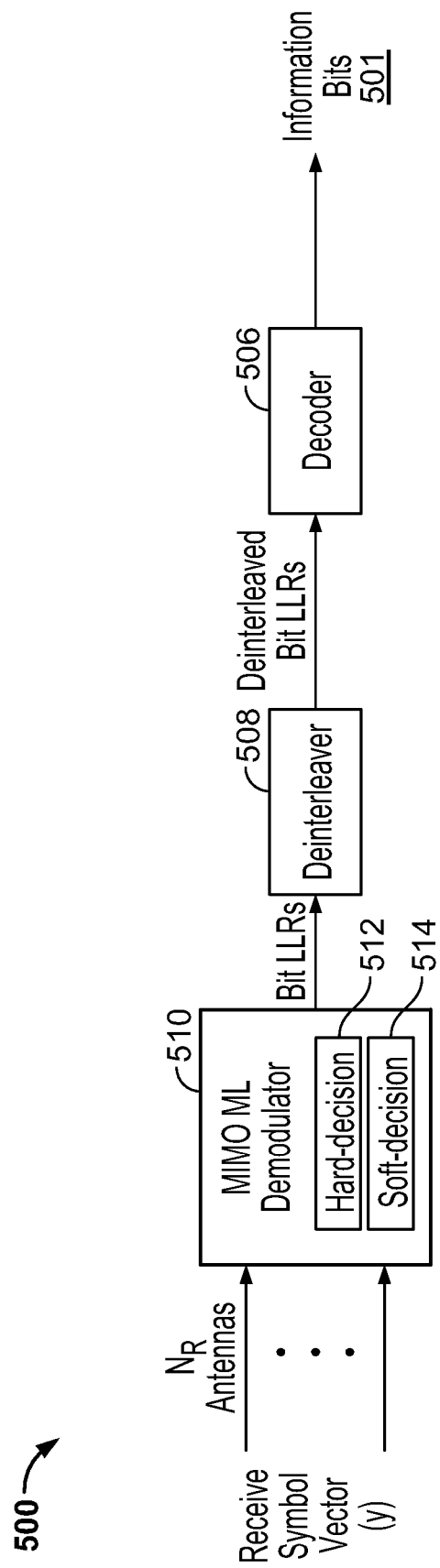
FIG. 5 shows an illustrative MIMO receiver including a soft-decision demodulator and/or a hard-decision demodulator in accordance with some embodiments.

Referring now to FIG. 5, an illustrative block diagram is shown of receiver 500 in accordance with some embodiments. Receiver 500 may have any of the features and functionalities of receiver 110 in FIG. 1. In some embodiments, receiver 500 may be a wireless receiver, such as those shown in FIG. 2. Receiver 500 can receive a data vector y using $N_R$ receive antennas and obtain an estimate of the originally transmitted information (e.g., information bits of FIG. 3). To decode the received data vector y, receiver 500 can include MIMO demodulator 510, deinterleaver 508, and decoder 506. Each of these receiver components may correspond to a transmitter component (e.g., transmitter 300 of FIG. 3) and may effectively undo the operation performed by the corresponding transmitter component. For example, MIMO demodulator 510 may correspond to modulator 310 that can demodulate/de-map received data vector y using at least the same modulation scheme and signal constellation set as that used by modulator 310. Deinterleaver 508 may correspond to interleaver 308 and may return the symbol order of the received data into its original order, e.g., the order expected by decoder 506. Decoder 506 may be a decoder that corresponds to encoder 306, and may perform decoding based on the same error correcting code as encoder 306. Thus, decoder 506 may produce an estimate of the transmitted information bits 301. In some embodiments, decoder 506 may be a Viterbi decoder or a Turbo decoder. If receiver 500 successfully interprets received data vector y, information bits 501 may be the same digital sequence as information bits 301.

Referring to MIMO demodulator 510 of FIG. 5 in more detail, MIMO demodulator 510 may calculate soft information for each bit of information contained within the intended signal, for example, using soft-decision block 514. The soft information may be in the form of a log-likelihood ratio ("LLR") for each received bit of intended information. As described above, each data vector x has S signal streams (or data symbols):

$$x = [x_1 x_2 \ldots x_S] \quad \text{(EQ. 2)}$$

Each signal stream (or data symbol) $x_s$ has W bits:

$$(b_{s,1}, \ldots, b_{s,W}) \Rightarrow x_s \quad \text{(EQ. 3)}$$

where $b_{s,n}$ represents the n-th bit in the s-th stream data symbol. In some embodiments, $M = 2^W$ is the size of the constellation set for the selected modulation scheme (e.g., M=2 for a 2 QAM/BPSK modulation scheme, M=4 for a 4 QAM/QPSK modulation scheme, and M=16 for a 16 QAM modulation scheme). The LLR for each bit in data vector x may be calculated according to EQ. 4:

$$LLR(b_{s,n}) = \log\frac{Pr\{b_{s,n}=1\}}{Pr\{b_{s,n}=0\}} \Rightarrow LLR(b_{s,n}) = \log\frac{Pr\{y \mid b_{s,n}=1\}}{Pr\{y \mid b_{s,n}=0\}} \quad \text{(EQ. 4)}$$

where $b_{s,n}$ is the transmitted bit of data vector x contained within received data vector y for which the LLR is being calculated. MIMO demodulator 510 can obtain a reliable log-likelihood ratio based on EQ. 4 by using accurate estimates of the channel information for the intended channel and any interference channels, as well as modulation information for these channels.

The log-likelihood ratio of EQ. 4 for a received data vector y may be calculated based on the following equation:

$$LLR(b_{s,n}) = \log\left(\sum_{x \in X_{s,n}^{(1)}} \exp\left(-\frac{\|y-Hx\|^2}{\sigma_z^2}\right)\right) - \log\left(\sum_{x \in X_{s,n}^{(0)}} \exp\left(-\frac{\|y-Hx\|^2}{\sigma_z^2}\right)\right) \quad \text{(EQ. 5)}$$

where $x_{s,n}^{(b)}$ is the set of all possible data vectors x with $b_{s,n}=b$. EQ. 5 represents a "true" soft-decision demodulation LLR calculation. In calculating this equation, the distance between y and Hx is calculated for every value of x. In other words, $\|y-Hx\|^2$ is calculated for $M^S$ different values of x. For example, for a 16 QAM modulation scheme (i.e., M=16) with 4 different streams (i.e., S=4), there will be 65,536 distance calculations for each data vector x. Furthermore, these calculations may require exponential and logarithm operations that may be complicated to implement. While the LLR calculation of EQ. 5 will provide optimal performance within a soft-decision demodulator such as MIMO demodulator 510, the complexity of the LLR calculation is high due to the large number of required distance calculations.

The soft-decision demodulation LLR computation based on EQ. 5 may be approximated as:

$$LLR(b_{s,n}) \approx \frac{1}{\sigma_z^2}\left[\min_{x \in X_{s,n}^{(1)}} \|y - Hx\|^2 - \min_{x \in X_{s,n}^{(0)}} \|y - Hx\|^2\right]. \quad (EQ.\ 6)$$

In this LLR computation, the minimum of $\|y-Hx\|^2$ over the set $x_{s,n}^{(1)}$ and the minimum of $\|y-Hx\|^2$ over the set $x_{s,n}^{(0)}$ are separately found. The number of elements in each of these sets is $M^S/2$. The approximate soft-decision demodulation LLR computation of EQ. 6 may be easier to compute than the true soft demodulation LLR computation of EQ. 5 due to the absence of exponential and logarithm operations. While the performance of the approximate soft-decision demodulation LLR computation is near optimal, the complexity of this computation is still high.

The complexity of the soft-decision demodulation LLR computation may be further reduced by using a dimension reduction scheme. For example, in the case of two streams $x_1$ and $x_2$ (i.e., S=2), instead of calculating the squared distances $\|y-Hx\|^2$ for all combinations of $x_1$ and $x_2$, the squared distances $\|y-Hx\|^2$ for a given $x_2$ may be calculated only for the optimal value of $x_1$ that minimizes $\|y-Hx\|^2$ and vice versa. Because determining the optimal value of $x_1$ that minimizes $\|y-Hx\|^2$ may be reduced to a one-dimensional problem, the optimal value of $x_1$ may be determined using efficient one-dimensional techniques, such as slicing, scaling, rounding, gray-coding, etc., and without any additional calculations of $\|y-Hx\|^2$. Generally, in the case of S signal streams $x_1, x_2, \ldots, x_S$, the LLR for a bit $b_{s,n}$ of signal stream $x_s$ may be calculated using:

$$LLR(b_{s,n}) \approx \quad (EQ.\ 8)$$

$$\frac{1}{\sigma_z^2}\left[\begin{array}{l}\min_{x_{K+1},\ldots,x_{s-1},x_s \in \tilde{x}_{s,n}^{(1)},x_{s+1},\ldots,x_S}\left(\min_{x_1,\ldots,x_K}\|y - Hx\|^2\right) - \\ \min_{x_{K+1},\ldots,x_{s-1},x_s \in \tilde{x}_{s,n}^{(0)},x_{s+1},\ldots,x_S}\left(\min_{x_1,\ldots,x_K}\|y - Hx\|^2\right)\end{array}\right]$$

where K<s≤S, and $\tilde{x}_{s,n}^{(b)}$ is the set of all possible signal values of the s-th stream with $b_{s,n}$=b, where b is equal to either 0 or 1. That is, the distance $$\min_{x_1,\ldots,x_K}\|y - Hx\|^2$$

for a given set $(x_{K+1}, \ldots, x_{s-1}, x_S)$ may be calculated only for the set $(x_1, \ldots, x_K)$ that minimizes the squared distance $$\min_{x_1,\ldots,x_K}\|y - Hx\|^2.$$

These and other dimension reduction schemes are described in greater detail in application Ser. No. 12/406,587, filed Mar. 18, 2009 and application Ser. No. 12/469,382, filed May 20, 2009, both of these applications are hereby incorporated by reference herein in their entirety.

Referring again to MIMO demodulator 510 of FIG. 5, MIMO demodulator 510 may calculate hard information for each bit of information contained within the intended signal, e.g., using hard-decision block 512. For example, the hard information may be in the form of a 0 or a 1 for each received bit of intended information. This process is referred to herein as hard-decision demodulation. In some embodiments, hard-decision demodulation for a transmitted data vector x may include determining the candidate signal values for each one of the S signal streams $x_s$ of the transmitted data vector x. A hard-decision demodulation technique may be used to map a received data vector y to the nearest signal values $\hat{x}$ of x.

In some embodiments, performing hard-decision demodulation may include determining the most likely transmitted data vector $\hat{x}$, given the received data vector y and the channel matrix H, as follows:

$$\hat{x} = \arg\min_{x \in X}\|y - Hx\|^2 \quad (EQ.\ 9)$$

where X is the set of all possible data vectors x. Solving the problem defined in EQ. 9 is referred to herein as maximum likelihood (ML) demodulation, and the most likely data vector $\hat{x}$ is referred to as the ML solution.

Figure 6:
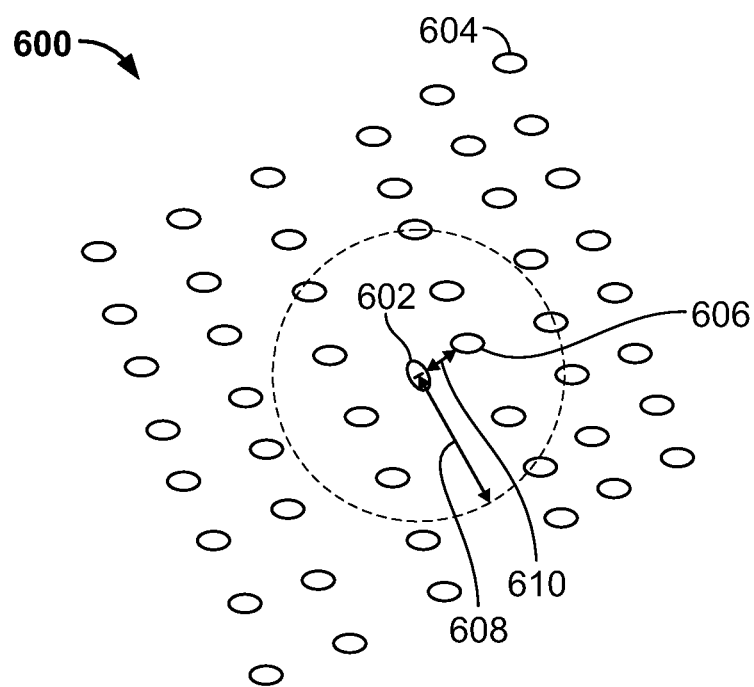
FIG. 6 illustrates a process for hard-decision demodulation using hard-decision sphere decoding to find the most likely transmitted data vector in accordance with some embodiments.

FIG. 6 illustrates a process for hard-decision demodulation using hard-decision sphere decoding to find the most likely transmitted data vector $\hat{x}$ in accordance with some embodiments. This process may be used, for example, by hard-decision block 512 of FIG. 5. Each vector Hx is represented by a lattice point (e.g., similar to lattice point 604) in a lattice field 600. All lattice points inside an n-dimensional sphere centered at the received vector y (represented by point 602) and of a determined radius $\sqrt{c_0}$ (represented by radius 608) are first identified. A search is performed for the nearest lattice point to the received vector y (i.e., to point 602) within radius 608. This nearest point 606 corresponds to the most likely transmitted data vector $\hat{x}$ (i.e., the ML solution). The distance metric 610 associated with the nearest point 606 corresponds to the minimum distance over all possible lattice points, i.e., $$\min_{x \in X}\|y - Hx\|^2.$$

In order to find the nearest lattice point to the received vector y (i.e., find the ML solution), channel matrix H may be decomposed using QR decomposition into an orthogonal, unitary $N_R \times N_R$ matrix Q, and an $N_R \times S$ upper triangular matrix R, such that H=QR. The constraint that a lattice point is located in a sphere centered at y with radius $\sqrt{c_0}$ (i.e., $c_0 \geq \|y-Hx\|^2$) is called a sphere condition and may be rewritten with a modified radius $d_0$ as follows:

$$d_0 \geq \|y' - Rx\|^2 \quad (EQ.\ 10)$$

where y'=$Q^H$y. This modified sphere condition enables using the upper triangular form of matrix R to perform a progressive search by signal streams $x_s, x_{s-1}, \ldots, x_1$ as the structure of matrix y'−Rx can be seen to be $$y' - Rx = \begin{bmatrix} y'_1 \\ y'_2 \\ \vdots \\ y'_{N_R} \end{bmatrix} - \begin{bmatrix} r_{1,1} & r_{1,2} & & r_{1,s} \\ & r_{2,2} & \cdots & r_{2,s} \\ & & \ddots & r_{N_R-1,s} \\ & & & r_{N_R,s} \end{bmatrix} \begin{bmatrix} x_1 \\ x_2 \\ \vdots \\ x_s \end{bmatrix}.$$ (EQ. 11)

In other words, the sphere condition in EQ. 10 may be rewritten as the sum of S components, a first of which only includes $x_s$, a second of which only includes $x_s$ and $x_{s-1}$, a third of which only includes $x_s$, $x_{s-1}$, and $x_{s-2}$, and so on. This can be seen in the following rewritten sphere condition:

$$d_0 \geq \sum_{j=1}^{S} \left| y'_j - \sum_{k=j}^{S} r_{j,k} x_k \right|^2.$$ (EQ. 12)

Each of the S components in the outer sum of EQ. 12 can be viewed as a branch metric $B(x_j)$ for a signal stream $x_j$ that is associated with a layer j, such that:

$$B(x_j) = \left| y'_j - \sum_{k=j}^{S} r_{j,k} x_k \right|^2, \text{ for } j = 1, \ldots, S.$$ (EQ. 13)

Sphere decoding may start from the last layer (i.e., from j=S) and proceed backwards (i.e., towards j=1) to take advantage of the structure of y'−Rx as discussed in EQS. 11 and 12. A path metric $P(x_j^S)$ can be defined as the sum of branch metrics from layer S until layer j, i.e., $$P(x_j^S) = \sum_{k=j}^{S} B(x_k), \text{ for } j = 1, \ldots, S.$$ (EQ. 14)

The sphere condition for a lattice point associated with a layer j may be expressed as $d_0 \geq P(x_j^S)$. Only the lattice points satisfying this sphere condition may be searched for the ML solution. The search space may thus be significantly reduced compared to exhaustive search where all lattice points are searched.

Figure 7:
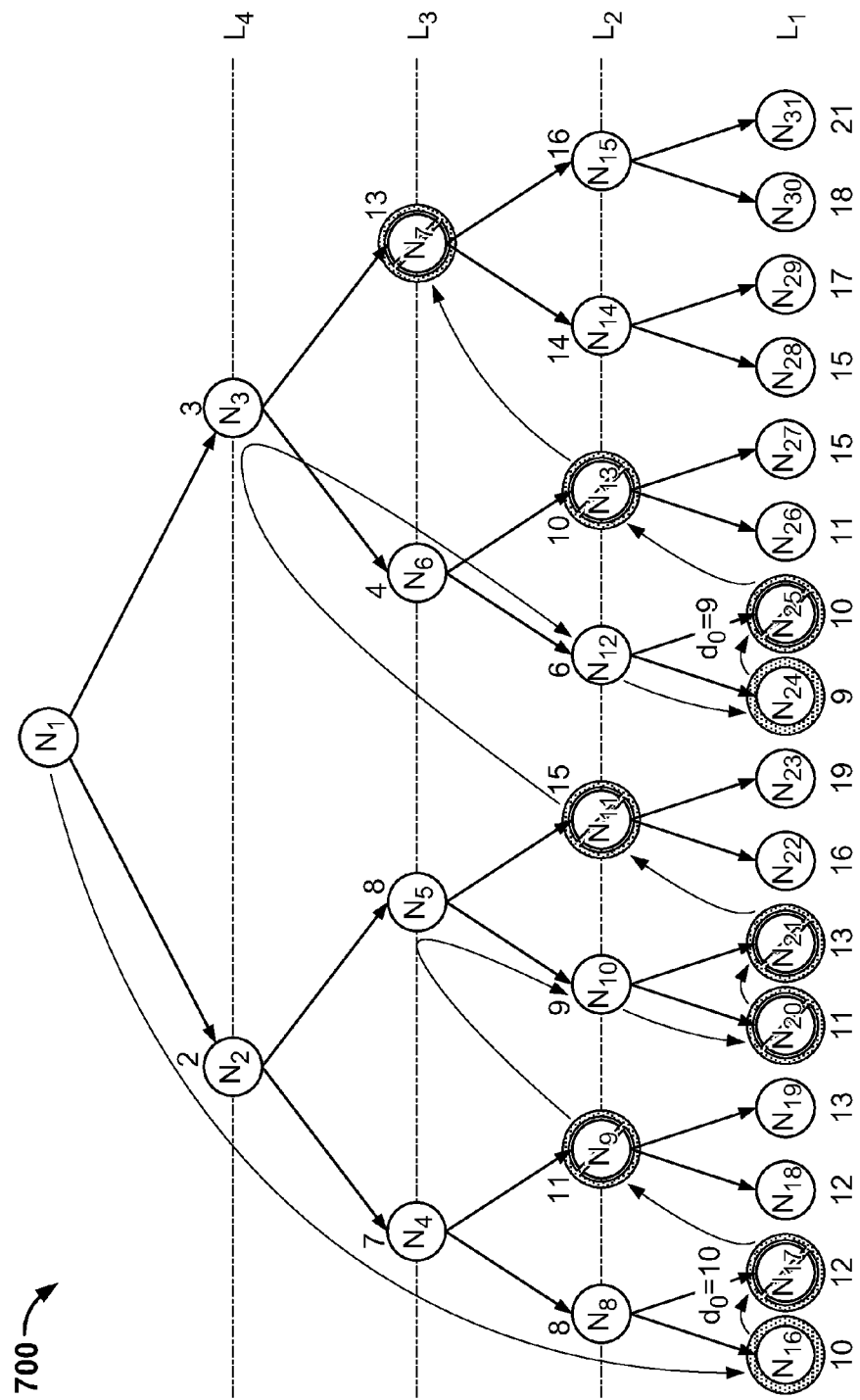
FIG. 7 illustrates a process for maximum likelihood (ML) demodulation in a 2 QAM/BPSK modulation scheme with four signal streams, using hard-decision sphere decoding according to some embodiments.

FIG. 7 illustrates a process of maximum likelihood (ML) demodulation using hard-decision sphere decoding according to some embodiments. In this illustrative example, a transmitted data vector x may have four signal streams (i.e., S=4 or x=[$x_1$ $x_2$ $x_3$ $x_4$]). Each signal stream $x_1$, $x_2$, $x_3$, and $x_4$ may have a width W of one bit that can be equal to either a 0 or 1. As described above, this configuration corresponds to a 2 QAM/BPSK modulation scheme with W=1, M=2, and S=4. The nodes of tree 700 represent all candidate signal values associated each with a bit of x that is equal to either a 0 or a 1. In particular, each layer of tree 700 corresponds to one signal stream (e.g., $L_1$ corresponds to $x_1$, $L_2$ to $x_2$, and so on). In addition, each node in layer $L_j$ corresponds to a candidate signal value in the signal stream corresponding to $L_j$. In particular, a left child in layer $L_j$ corresponds to a $x_j$=(0) (i.e., $b_{j,1}$=0) whereas a right child in layer $L_j$ corresponds to $x_j$=(1) (i.e., $b_{j,1}$=1). For example, $N_2$ in layer $L_4$ corresponds to $x_4$=(0), whereas $N_3$ corresponds to $x_4$=(1). Similarly, $N_{16}$ corresponds to $x_1$=(0), whereas $N_{17}$ corresponds to $x_1$=(1).

Nodes located in the bottom layer $L_1$ of tree 700 are referred to as leaf nodes (i.e., nodes $N_{16}$ through $N_{31}$). Each leaf node corresponds to one candidate data vector. For example, $N_{16}$ may correspond to x=[$x_1$=(0) $x_2$=(0) $x_3$=(0) $x_4$=(0)], whereas $N_{17}$ may correspond to x=[$x_1$=(1) $x_2$=(0) $x_3$=(0) $x_4$=(0)]. Finding the ML solution can therefore be seen as finding the leaf node that is closest (i.e., with the smallest distance metric) to the received vector y.

As discussed in the hard-decision sphere decoding above, a branch metric $B(x_j)$ may be associated with each branch of tree 700. In addition, each node may be associated with a path metric $P(x_j^S)$ that represents the distance from that node to the root node $N_1$. For ease of explanation, this path metric is denoted next to each node in tree 700. For example, $N_2$ is associated with a path metric of 2 and $N_4$ is associated with a path metric of 7. In some embodiments, some or all of these path metrics may be pre-computed. In some embodiments, some path metrics are never computed, for example, because their corresponding nodes are never searched.

According to some embodiments, a sphere search is performed over the candidate signal values associated with the nodes of tree 700 within a search radius value $d_0$. This search is preformed to determine candidate signal values for each signal stream $x_1$, $x_2$, $x_3$, and $x_4$ with a smallest distance metric from the received vector y (i.e., to determine the most likely transmitted data vector $\hat{x}$, or ML solution). Initially, the search radius value is set to infinity (i.e., $d_0=\infty$) and the path metric associated with the root node $N_1$ is set to zero (i.e., $P(x_{S+1}^S)=0$). Starting from the top layer (i.e., layer $L_4$), the path metrics for each node associated with a candidate signal value of a signal stream $x_j$ are recursively determined using the following equation:

$$P(x_j^S) = P(x_{j+1}^S) + B(x_j).$$ (EQ. 15)

If the determined path metric for a node is greater than or equal to the current value of $d_0$, the node and all its children are removed from the tree because they correspond to lattice points outside the search sphere. Otherwise, the process proceeds to the next layer (i.e., from $L_j$ to $L_{j-1}$). When the search reaches a leaf node (i.e., a node in the bottom tree layer $L_1$) and the leaf node is determined to have a path metric that is smaller than the current value of $d_0$, the leaf node is identified as the current best leaf node. In this case, $d_0$ is updated by setting it to the path metric of the determined current best leaf node (i.e., $d_0$ is set to $P(x_1^S)$). In some embodiments, the current best leaf node may be stored in a memory storage unit, e.g., in the soft-decision block 514 of FIG. 5. At the end of the sphere search (i.e., when all nodes have been searched and/or removed), the leaf node that has last been identified as the current best leaf node corresponds to the ML solution. In other words, the candidate data vector represented by the identified best leaf node is the ML solution. This process will now be illustrated with the exemplary path metrics of FIG. 7.

Referring to tree 700, $N_2$ may first be searched and its path metric may first be determined (i.e., by computing $p(x_4^4)$=B($x_4$)=2). Next, $N_4$ may be searched and its path metric may be determined (i.e., by computing $P(x_3^4)$=B($x_3$)+P($x_3^4$)=7). Similarly, the path metric of $N_8$ in layer $L_2$ may next be determined. Since $d_0$ is initially set to infinity, no node is removed at first. Next, a first leaf node $N_{16}$ is reached, and its path metric may be determined (i.e., by computing $P(x_1^4)$=10). Since $N_{16}$ is a leaf node and its path metric is less than the current search radius value $d_0$, $N_{16}$ is identified as the current best leaf node and $d_0$ is updated to the path metric of $N_{16}$, i.e., $d_0$ is set to 10. Nodes that have been identified as current best leaf nodes are marked by a colored border (e.g., similar to node $N_{16}$). Next, the path metric of $N_{17}$ may be determined. Since the path metric of $N_{17}$ is greater than the current search radius value $d_0$=10, $N_{17}$ is removed from the tree. Removed nodes are denoted by crossed-out nodes (i.e., similar to node $N_{17}$ in FIG. 7). The process continues to an unsearched node in a previous layer, e.g., node $N_9$ in $L_2$. Since the path metric of $N_9$ exceeds the current search radius value $d_0$=10, $N_9$ as well as its children nodes $N_{18}$ and $N_{19}$ are removed. The process continues in this way, removing nodes $N_{20}$, $N_{21}$, and $N_{11}$ (as well as the children nodes of $N_{11}$, i.e., $N_{22}$ and $N_{23}$) because the path metrics of $N_{20}$, $N_{21}$, and $N_{11}$ exceed $d_0$. When leaf node $N_{24}$ is reached, and its path metric is determined to be smaller than the current search radius value $d_0$, $N_{24}$ is identified as the current best leaf node and $d_0$ is updated to the path metric of $N_{24}$, i.e., $d_0$ is set to 9. Next, the path metric for $N_{25}$ may be determined to be greater than $d_0$, so $N_{25}$ is removed. Next, nodes $N_{13}$ then $N_7$ are searched and their path metrics are determined to exceed the current search radius value $d_0$=9. $N_{13}$ (and its children $N_{26}$ and $N_{27}$) and $N_7$ (and its children $N_{14}$, $N_{15}$, and $N_{28}$ through $N_{31}$) are therefore removed and the tree search process finishes at $N_7$.

At the end of the tree search process described above, the leaf node last identified as the current best leaf node corresponds to the data vector with the smallest distance to the received vector y (i.e., the ML solution). In the illustrative example of FIG. 7, that leaf node is $N_{24}$ and its associated path metric, 9, corresponds to the smallest distance metric to the received vector y. The candidate data vector corresponding to $N_{24}$, i.e., $x=[x_1=(0)\ x_2=(0)\ x_3=(0)\ x_4=(1)]$ is thus determined to be the ML solution.

As illustrated in FIG. 7, a node of tree 700 is never visited if its path metric is greater than or equal to the current sphere radius value determined at any given time during the search. For example, only six leaf nodes $N_{16}$, $N_{17}$, $N_{20}$, $N_{21}$, $N_{24}$, and $N_{25}$ are visited (i.e., searched), whereas the other ten leaf nodes are never searched. This reduces the complexity of the hard-decision sphere decoding over exhaustive search. However, these hard-decision sphere decoding techniques may not be directly applicable for soft decoding since they determine the ML solution regardless of bit representation.

It should be understood that hard-decision demodulation can also be obtained from a received signal using other MIMO hard-decision demodulation techniques or detector, e.g., linear equalization (a zero-forcing (ZF) linear detector, minimum mean square error (MMSE) detector), nonlinear decision feedback equalization (DFE), ZF-DFE, MMSE-DFE, or a serial interference canceller. Any other suitable hard-decision demodulation technique may also be used.

Figure 13:
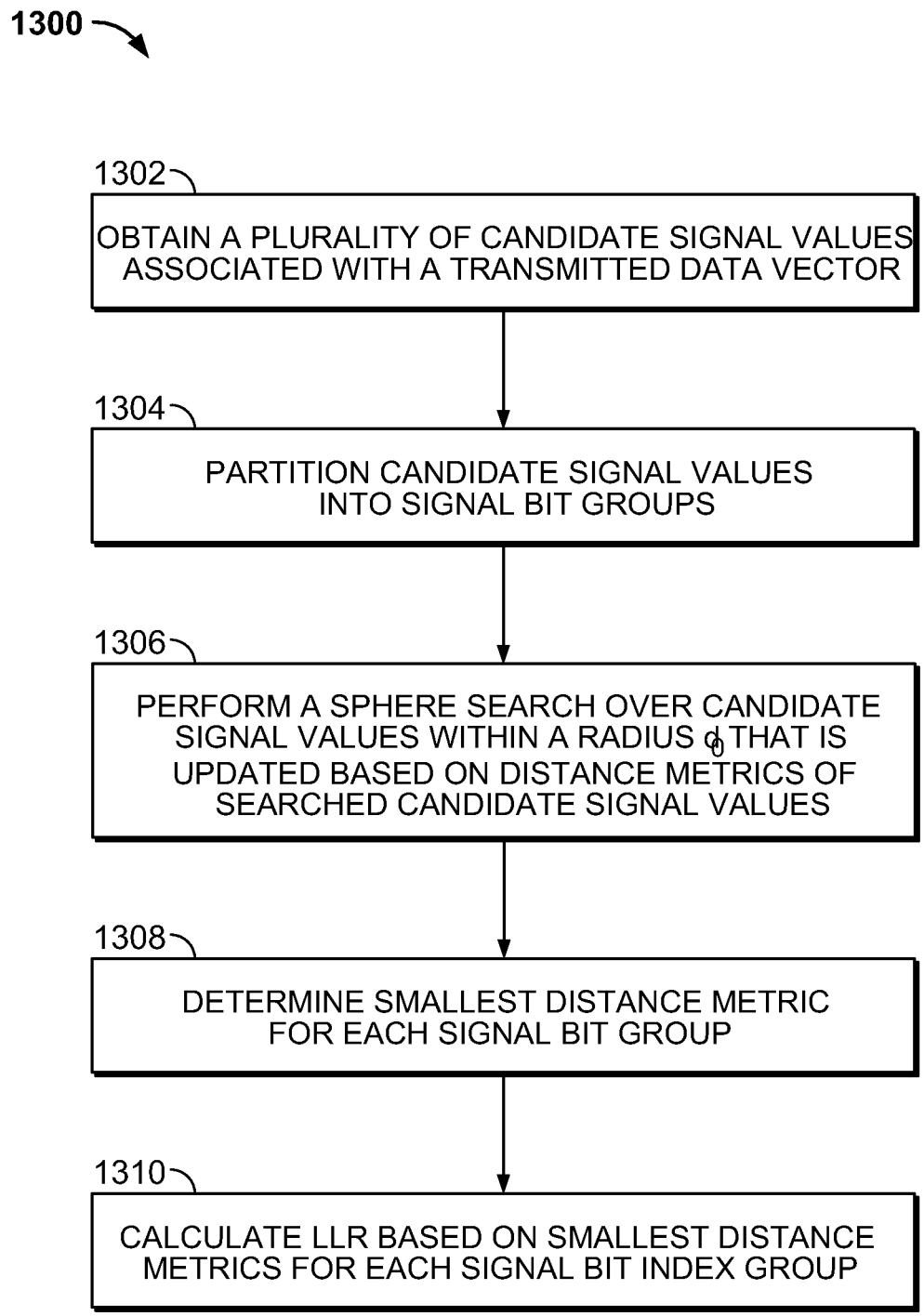
FIG. 13 shows a flowchart of a process for computing soft information for a transmitted data vector using soft sphere ML demodulation in accordance with some embodiments.

FIG. 13 shows a flowchart of process 1300 for computing soft information for a transmitted data vector using soft sphere ML demodulation in accordance with some embodiments. Process 1300 may be performed to output a log-likelihood ratio (LLR) associated with a data vector x having S signal streams each of width W bits. Process 1300 may be implemented using, e.g., soft-decision block 514 of FIG. 5. Process 1300 includes 1302, 1304, 1306, 1308, and 1310.

At 1302, a plurality of candidate signal values for the transmitted data vector x is first obtained. For example, all possible signal values for each signal stream $x_s$ may be determined. In some embodiments, this may be achieved by setting each of the W bits in each signal stream to a 0 or a 1.

At 1304, the candidate signal values obtained at 1302 are partitioned into distinct groups based on the signal value or values of a subset of signal streams of the transmitted data vector x. This subset of signal streams corresponds to the signal streams selected for soft decoding. In some embodiments, all signal values corresponding to candidate data vectors with $b_{s,n}=0$ in a signal stream $x_s$ are grouped in a first group, whereas all signal values corresponding to candidate data vectors with $b_{s,n}=1$ in the signal stream $x_s$ are grouped in a second group. In other words, using the notation $x_{s,n}^{(b)}$ to refer to the set of all possible data vectors x with $b_{s,n}=b$ the first group may correspond to $X_{s,n}^{(0)}$ and the second group may correspond to $X_{s,n}^{(1)}$. These groups will be referred to herein as signal bit groups, and the corresponding subset of signal streams (e.g., $x_s$ in the above example) will be referred to as soft streams.

At 1306, a sphere search is performed over the signal bit groups determined at 1304 to identify, for each signal bit group, the candidate signal values with a smallest distance metric (e.g., as defined by a path metric $P(x_j^S)$ in EQS. 13 an 14). The sphere search is performed within a search radius value $d_0$ that is dynamically updated as the search progresses. In some embodiments, process 1300 stores a smallest distance metric and a corresponding best ML candidate data vector for each signal bit group using, for example, a memory storage unit (not shown) in the soft-decision block 514 of FIG. 5. The smallest distance metrics for each signal bit groups may be dynamically updated as the search progresses.

At 1308, the smallest distance metric for each signal bit group is determined. For example, at the end of the sphere search of 1306, the smallest distance metrics stored in the memory storage unit may correspond to the smallest distance metrics for each signal bit group.

At 1310, an LLR associated with each bit of the soft signal streams is calculated based on the smallest distance metrics for each signal bit group determined at 1308. Process 1300 will be illustrated in greater detail, below, with reference to FIGS. 8, 9, and 14.

Figure 14:
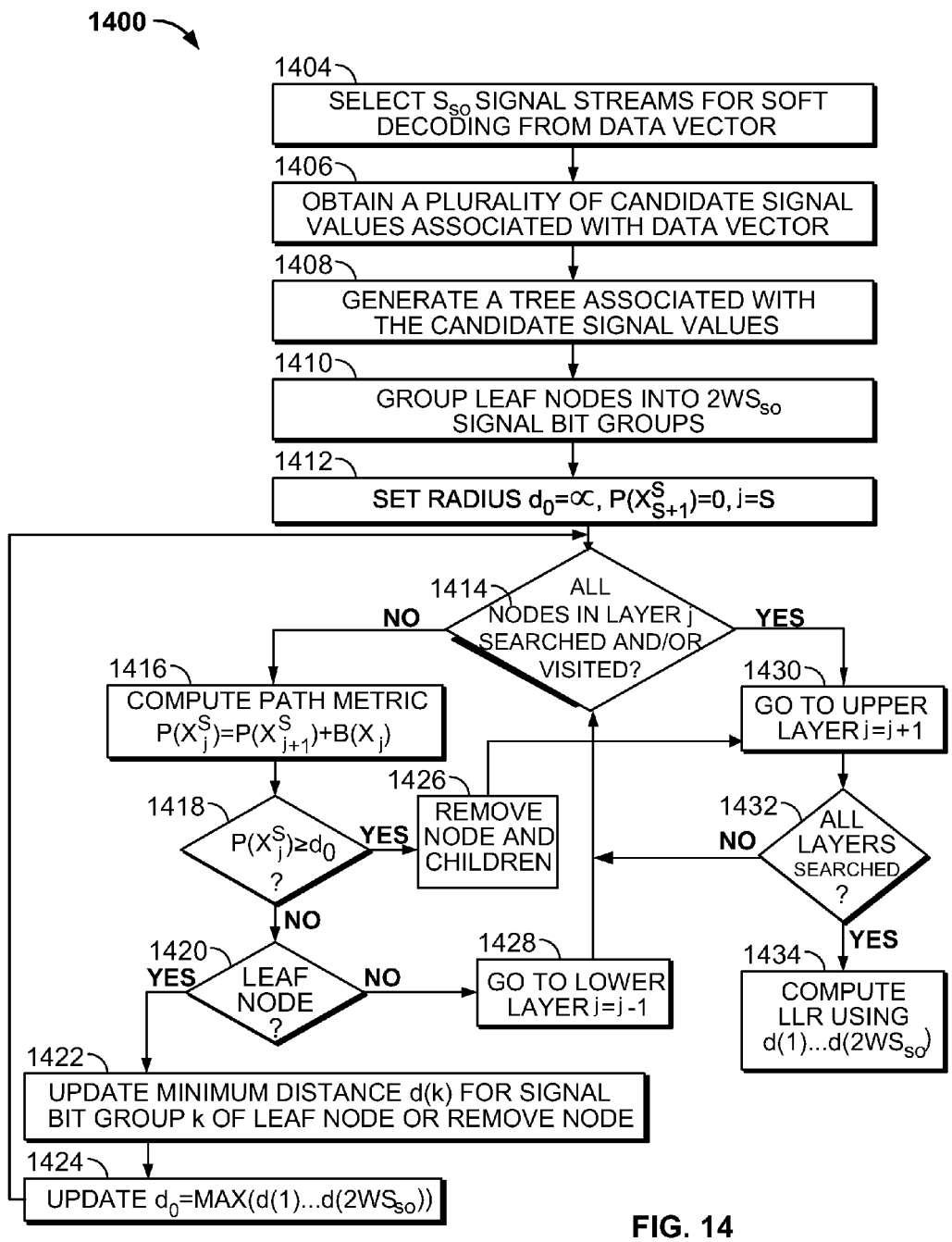
FIG. 14 shows a flowchart of a process for computing soft information for a subset of signal streams of a transmitted data vector using soft sphere ML demodulation in accordance with some embodiments.

FIG. 14 shows a flowchart of process 1400 for computing soft information for a transmitted data vector using soft sphere ML demodulation in accordance with some embodiments. Process 1400 may be performed as a part of process 1300 of FIG. 13 (e.g., using soft-decision block 514 of FIG. 5).

At 1404, a subset $S_{so}$ of the S ($S_{so} \leq S$) signal streams of the transmitted data vector x is selected for soft decoding. These signal streams may correspond to the first $S_{so}$ signal streams $x_1, x_2, \ldots, x_{S_{so}}$ of the transmitted data vector x. The $S_{so}$ selected streams will be referred to herein as soft streams. In some embodiments, only one signal stream, $x_1$, may be selected at 1404 for soft decoding (i.e., $S_{so}$=1). In some embodiments, two signal streams, $x_1$ and $x_2$, may be selected for soft decoding (i.e., $S_{so}$=2).

At 1406, a plurality of candidate signal values associated with the transmitted data vector x is obtained. For example, all possible candidate data vectors with S streams of width W bits may be obtained. This may be achieved, e.g., by setting each bit of each signal stream of x to a 0 or a 1.

At 1408, a tree associated with the plurality of candidate signal values obtained at 1406 is generated. As discussed in connection with tree 700 of FIG. 7, each node in the tree may represent a candidate signal value in a layer corresponding to a signal stream. In addition, each leaf node in the tree may correspond to a candidate data vector.

At 1410, leaf nodes of the tree generated at 1408 are grouped into distinct groups based on the signal value or values of the $S_{so}$ soft streams. As explained above, these groups are referred to as signal bit groups. For example, candidate signal values corresponding to candidate data vectors with $x_1=(0)$ may be grouped together in a first signal bit group (i.e., corresponding to $b_{1,1}=0$, or equivalently to the set $x_{1,1}^{(0)}$), whereas candidate signal values corresponding to all candidate data vector with $x_1=(1)$ are grouped together in a second signal bit group (i.e., corresponding to $b_{1,1}=1$, or equivalently to the set $x_{1,1}^{(1)}$). In general, $2WS_{so}$ bit groups may be determined, corresponding to a different signal value or values for the $S_{so}$ soft streams.

1412-1434 describe performing a sphere search over the tree generated at 1408 and within a dynamically updated search radius value $d_0$. Initially, at 1412, the search radius value $d_0$ is set to infinity. In addition, a smallest distance metric for each signal bit group $d(1), \ldots, d(2WS_{so})$ is set to infinity, where $d(k)$ refers to the minimum distance metric of signal bit group k ($k=1, 2, \ldots, 2WS_{so}$). Also, at 1412, the path metric $P(x_{S+1}^S)$ associated with the root node is set to zero, and the process starts at layer S (i.e., $j=S$).

At 1414, it is determined whether all nodes in layer j have been searched and/or removed. If at least one node has not been searched and/or removed, a node in layer j is selected and searched. As referred to herein, searching a node may include determining a path metric of the node, comparing the determined path metric to a search radius value $d_0$, and depending on the comparison, either removing the node and its children or updating the search radius value $d_0$ based on the determined path metric of the node. In particular, at 1416, a path metric of a node in layer j is computed using the EQ. 9, i.e., $P(x_j^S)=P(x_{j+1}^S)+B(x_j)$. As described above in connection with FIG. 6, $B(x_j)$ refers to a branch metric for a signal stream $x_j$ that is associated with a layer j, and $P(x_j^S)$ refers to a path metric defined as the sum of branch metrics from layer S until layer j.

At 1418, the path metric determined at 1416 is compared to the current search radius value $d_0$. If the determined path metric is greater than or equal to $d_0$, the node and its children are removed from the tree at 1426. The search may then proceed to an upper layer at 1430. If, however, the determined path metric is less than $d_0$, 1420 may be performed next.

At 1420, it is determined whether the node being searched is a leaf node, i.e., if it is associated with a bottom layer of the search tree. If the node being searched is not a leaf node, the search proceeds to an upper layer (i.e., j is set to j−1) at 1428.

If, instead, the node being searched is a leaf node, then 1422 may be performed. At 1422, the path metric of the leaf node currently being searched may be used to update the minimum distance of the signal bit group corresponding to that leaf node, these signal bit groups having been determined at 1410. As explained above, this minimum distance is referred to as $d(k)$, where k is the index of the signal bit group corresponding to the leaf node (i.e., $k=1, 2, \ldots, 2WS_{so}$). In some embodiments, the current minimum distance for each signal bit group may be stored in a memory storage unit (not shown) in the soft-decision block 514 of FIG. 5. If the path metric computed at 1416 is less than the determined value of $d(k)$, then $d(k)$ is updated by setting it to the path metric of the leaf node. Otherwise, $d(k)$ is kept unchanged and the leaf node is removed. Next, 1424 may be preformed.

At 1424, the search radius value $d_0$ is updated based on the minimum distance $d(k)$ from 1422. For example, the search radius value $d_0$ may be updated by determining the maximum of the current smallest distance metrics associated with each signal bit group as follows, $$d_0=\max(d(1), \ldots, d(2WS_{so})).$$

Next, 1414 may be performed again to check whether all nodes in layer j have been searched and/or removed.

If at 1414, it is determined that all nodes in layer j have been searched and/or removed (i.e., all layers have been searched), then the process continues to an upper layer (i.e., j is set to j+1) at 1430. Next, 1432 may be performed.

At 1432, it is determined whether all nodes in all layers have been either searched and/or removed. If some nodes have not been either searched and/or removed, 1414 may then be performed again. Otherwise, if all layers have been either searched and/or removed, 1434 may next be performed.

At 1434, an LLR for each bit of the $S_{so}$ soft streams is computed using the determined minimum distances $d(1), \ldots, d(2WS_{so})$. These distances may correspond to the distance metrics stored at 1432, i.e., at the end of the sphere search. In some embodiments, the smallest distance $d(1)$ may correspond to $$\min_{x \in X_{1,1}^{(0)}} \|y - Hx\|^2$$

whereas the smallest distance $d(2)$ may correspond to $$\min_{x \in X_{1,1}^{(1)}} \|y - Hx\|^2,$$

where $X_{1,1}^{(b)}$ is the set of all possible data vectors x with $b_{1,1}=b$. Distance metrics $d(1)$ and $d(2)$ can therefore be used for calculating the LLR of signal stream $x_1$ (i.e., of bit $b_{1,1}$) as set forth in EQ. 6 above. Process 1400 will be illustrated for $S_{so}=1$ and $S_{so}=2$ in FIGS. 8 and 9, respectively.

In some embodiments, at the end of process 1300 or 1400, the remaining signal streams of the transmitted data vector x (i.e., the signal streams of x other than the first set of $S_{so}$ soft signal streams) may be decoded using any suitable hard-decision or soft-decision demodulation technique or detector, e.g., linear equalization (a zero-forcing (ZF) linear detector, minimum mean square error (MMSE) detector), nonlinear decision feedback equalization (DFE), ZF-DFE, MMSE-DFE, or a serial interference canceller. This may be done, e.g., using hard-decision block 512 or soft-decision block 514 of FIG. 5.

In some embodiments, process 1300 or 1400 may be used to compute LLRs for a second set of soft signal streams $S_{so}'$ selected from the S signal streams of the transmitted data vector x. This may be achieved by appropriately reordering the S signal streams in x such that the second set of soft signal streams are the first signal streams in the reordered transmitted data vector. This reordering allows the second set of soft signal streams to correspond to bottom layers in a binary tree representation of all possible data vectors. The received vector y and the channel matrix H are also reordered to reflect the reordering of the signal streams of x. This reordering may be achieved, for example, by multiplying x, y, and H with appropriate permutation matrices. Each permutation matrix may have only one entry in each column equal to one and only one entry in each row equal to one. The same processes 1300 or 1400 may then be reapplied to the reordered $x^p$, $y^p$, and $H^p$ to compute soft information for the second set of signal streams. For example, LLRs may be computed for stream $x_2$ of the transmitted data vector $x=[x_1\ x_2\ x_3\ x_4]$ by multiplying x with a permutation matrix to yield $x^p=[x_2\ x_1\ x_3\ x_4]$. The same processes 1300 or 1400 may then be applied to $x^p$ to compute LLRs for $x_2$. In particular, in a binary tree representation of all possible data vectors similar to binary tree 700 of FIG. 7, leaf nodes would correspond to signal stream $x_2$ rather than $x_1$.

As opposed to the hard sphere decoder of FIG. 7 where the search radius value $d_0$ is updated to the smallest distance metric up to the currently searched node irrespective of bit grouping, the processes of FIGS. 13 and 14 provide LLR computation that are optimal (i.e., by finding the LLR as defined in EQS. 5 and 6) while updating $d_0$ to the maximum of the smallest distance metrics for all signal bit groups. As described above, these processes may require storing the current best leaf node and its path metric for each signal bit group.

Figure 8:
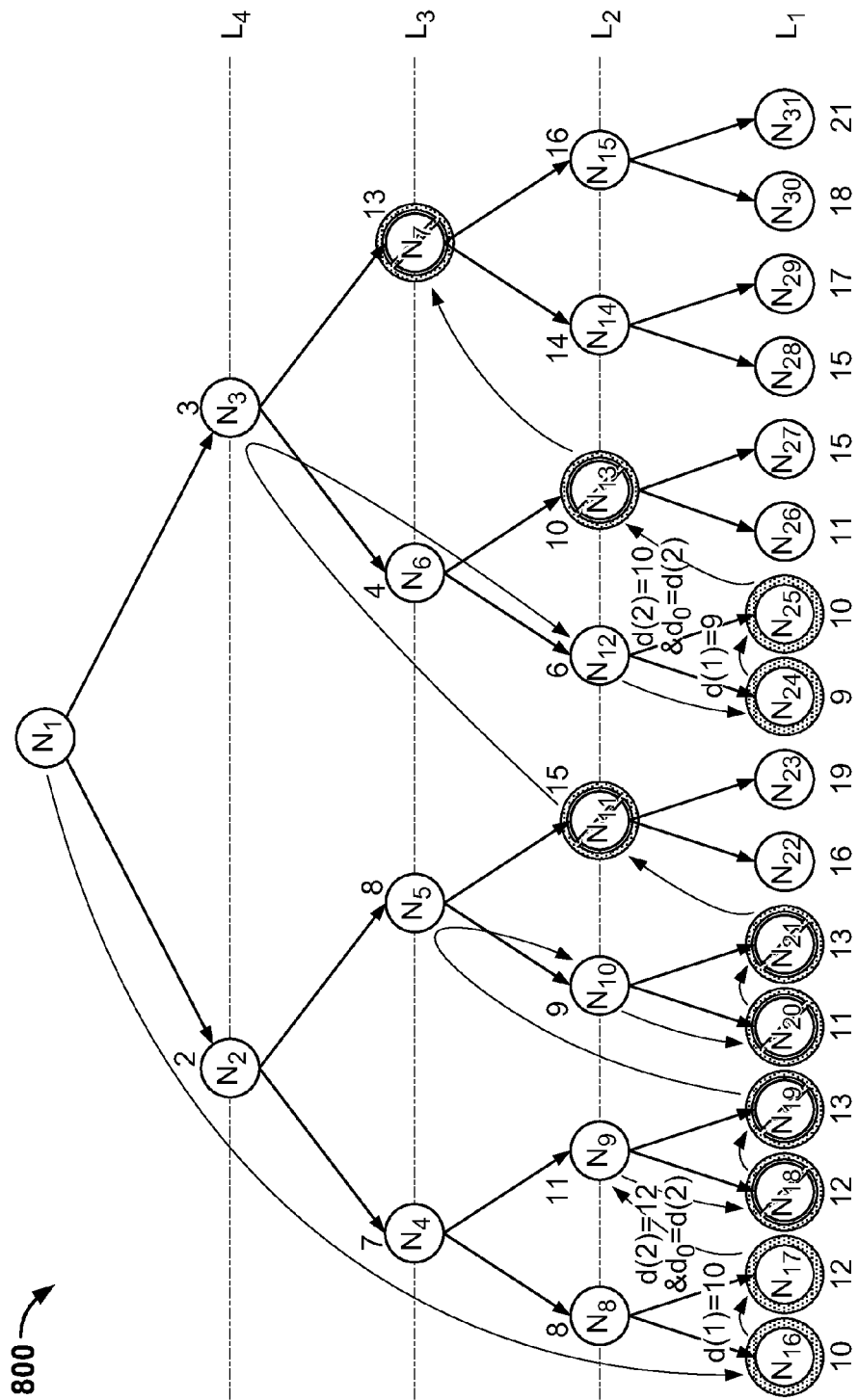
FIG. 8 graphically illustrates a process for soft sphere ML demodulation in a 2 QAM/BPSK modulation scheme with four signal streams, one of which is selected for soft decoding in accordance with some embodiments.

FIG. 8 graphically illustrates process 1400 of FIG. 14 for ML demodulation using soft sphere decoding in a 2 QAM/BPSK modulation scheme (i.e., W=1) where S=4 and $S_{so}$=1 (i.e., one signal stream, $x_1$, is selected for soft decoding) in accordance with some embodiments.

As described in 1404-1410 of FIG. 14, candidate signal values corresponding to all data vectors having four signal streams of width W=1 bit are obtained and used to generate binary tree 800. In particular, and similar to tree 700 of FIG. 7, tree 800 has nodes $N_1$ through $N_{31}$ arranged in 4 layers, where each layer corresponds to one stream of transmitted data vector x=[$x_1$ $x_2$ $x_3$ $x_4$]. Each left child node in layer $L_j$ corresponds to a signal value $x_j$=(0) and each right child node corresponds to a signal value $x_j$=(1). For ease of explanation, path metrics are denoted next to each node. However, it should be understood that some path metrics may be pre-computed, and/or some path metrics may never be determined, for example, if they correspond to nodes that are never searched.

As described in 1410 of FIG. 14, the leaf nodes of tree 800 are grouped into 2W$S_{so}$=2 bit groups. Even-numbered leaf nodes $N_{16}$, $N_{18}$, $N_{20}$, . . . , $N_{30}$ are grouped in a first bit group corresponding to $b_{1,1}$=0. Odd-numbered leaf nodes $N_{17}$, $N_{19}$, $N_{21}$, . . . , $N_{31}$ are grouped in a second bit group corresponding to $b_{1,1}$=1.

In some embodiments, tree 800 is searched as shown in FIG. 8 and as described in 1412-1432 of FIG. 14. In particular, the search radius value $d_0$ as well as the minimum distances for each signal bit group d(1), . . . , d(2W$S_{so}$) are initially set to infinity. In addition, the path metric of the root node is set to zero, and the process starts at layer $L_4$ (e.g., as described in 1412 of FIG. 14). Node $N_2$ of layer $L_4$ may first be searched and its path metric may be determined to be 2 (e.g., as described in 1416 of FIG. 14). Next, nodes $N_4$ in layer $L_3$, $N_8$ in layer $L_2$, then $N_{16}$ in layer $L_1$ are searched and their path metrics are determined. Since the determined path metric of leaf node $N_{16}$ is less than the current search radius value $d_0$, and since $N_{16}$ is a leaf node corresponding to the first signal bit group, the minimum distance of the first signal bit group is updated, i.e., d(1) is set to the path metric of $N_{16}$ (e.g., as described at 1422 of FIG. 14). The value of $d_0$ is still infinity because d(2) has not been updated yet. Next, $N_{17}$ is searched. Because the computed path metric of $N_{17}$ is less than the current search radius value $d_0$, and since $N_{17}$ is a leaf node corresponding to the second signal bit group, the minimum distance of the second signal bit group is updated, i.e., d(2) is set to the path metric of $N_{17}$. The value of the search radius $d_0$ is updated to the maximum of d(1) and d(2), which in this example sets $d_0$ to d(2)=12 (e.g., as described at 1424 of FIG. 14).

The search continues as described at 1430, by going to an upper layer $L_2$ and searching an unsearched node in $L_2$, for example, $N_9$. Since the path metric of $N_9$ is determined to be less than the current search radius value $d_0$=12, the search continues to $N_{18}$ and $N_{19}$ in layer $L_1$. Both $N_{18}$ and $N_{19}$ are removed because their respective path metrics are determined to be greater than or equal to the current value of $d_0$ (e.g., as described at 1418 of FIG. 14). The process continues as described in 1414-1432 through nodes $N_5$, $N_{10}$, $N_{20}$, $N_{21}$, then $N_{11}$. $N_{20}$ is removed since its associated path metric is greater than the current value of d(1) (e.g., as described at 1422 of FIG. 14). Both $N_{21}$ then $N_{11}$ are removed because their path metrics are greater than the current search radius value $d_0$. Next, $N_3$, $N_6$, then $N_{12}$ are searched. Since the path metrics of these nodes are less than $d_0$, the process continues to leaf nodes $N_{24}$ and $N_{25}$.

At node $N_{24}$, d(1) is updated to a new minimum value, i.e., d(1) is set to the path metric of $N_{24}$, 9. The value of $d_0$ remains unchanged since d(2) is still set to 12 at this point. At $N_{25}$, d(2) is updated to a new minimum value, i.e., d(2) is set to the path metric of $N_{25}$, 10. In addition, the current search radius value $d_0$ is updated to the maximum of d(1) and d(2). In this example, $d_0$ is updated to d(2)=10. Next, nodes $N_{13}$ then $N_7$ are searched and removed because their path metrics are greater than or equal to the current search radius value $d_0$, and the search finishes at $N_7$.

At the end of the search process described above, the current smallest distance metrics for each signal bit group is determined to be the smallest distance metric (i.e., d(1)=9 and d(2)=10). These determined smallest distance metrics may be used to compute soft information for soft stream $x_1$. For example, the determined smallest distance d(1) corresponds to $$\min_{x \in X_{1,1}^{(0)}} \|y - Hx\|^2$$

and the determined smallest distance d(2) corresponds to $$\min_{x \in X_{1,1}^{(1)}} \|y - Hx\|^2.$$

Distance metrics d(1) and d(2) can therefore be used for calculating the LLR of bit $b_{1,1}$ in stream $x_1$ as set forth in EQ. 6 above. The process thus terminates at node $N_7$, having visited eight leaf nodes to compute the LLR of $x_1$.

In some embodiments, the same or other demodulation techniques may be applied to compute soft or hard information for the remaining signal streams of the transmitted data vector x, i.e., for signal streams $x_2$, $x_3$, and $x_4$. For example, any suitable soft-decision or hard-decision demodulation technique may be applied to decode signal streams $x_2$, $x_3$, and $x_4$.

Figure 9:
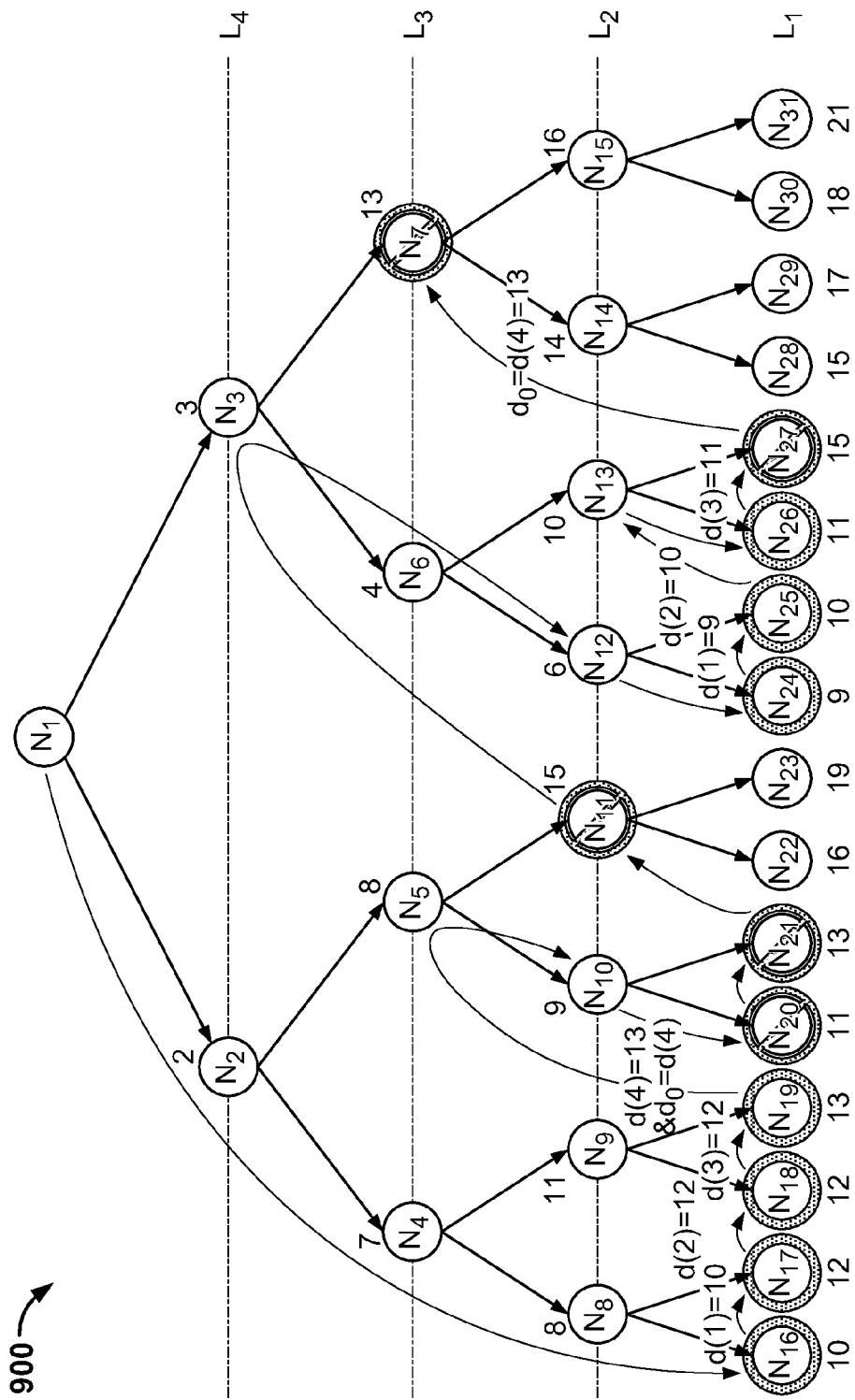
FIG. 9 graphically illustrates a process for soft sphere ML demodulation in a 2 QAM/BPSK modulation scheme with four signal streams, two of which are selected for soft decoding in accordance with some embodiments.

FIG. 9 graphically illustrates process 1400 of FIG. 14 for ML demodulation using soft sphere decoding in a 2 QAM/BPSK modulation scheme (i.e., W=1) where S=4 and $S_{so}$=2 (i.e., two signal stream, $x_1$ and $x_2$ are selected for soft decoding) in accordance with some embodiments.

As described in 1404-1410 of FIG. 14, candidate signal values corresponding to all data vectors having four signal streams of width W=1 bit are obtained and used to generate binary tree 900. In particular, and similar to tree 700 of FIG. 7, tree 900 has nodes $N_1$ through $N_{31}$ arranged in 4 layers, where each layer corresponds to one stream of transmitted data vector x=[$x_1$ $x_2$ $x_3$ $x_4$]. Each left child node in layer $L_j$ corresponds to a signal value $x_j$=(0) and each right child node corresponds to a signal value $x_j$=(1). For ease of explanation, path metrics are denoted next to each node. However, it should be understood that some path metrics may be pre-computed, and/or some path metrics may never be determined, for example, if they correspond to nodes that are never searched.

As described in 1410 of FIG. 14, the leaf nodes of tree 900 are grouped into 2W$S_{so}$=4 bit groups. Leaf nodes $N_{16}$, $N_{20}$, $N_{24}$, and $N_{28}$ are grouped in a first bit group corresponding to $b_{2,1}b_{1,1}$[00]. Leaf nodes $N_{17}$, $N_{21}$, $N_{25}$, and $N_{29}$ are grouped in a second bit group corresponding to $b_{2,1}b_{1,1}$[01]. Leaf nodes $N_{18}$, $N_{22}$, $N_{26}$, and $N_{30}$ are grouped in a third bit group corresponding to $b_{2,1}b_{1,1}$=[10]. Leaf nodes $N_{19}$, $N_{23}$, $N_{27}$, and $N_{31}$ are grouped in a fourth bit group corresponding to $b_{2,1}b_{1,1}$=[11].

In some embodiments, tree 900 is searched as described in 1412-1432 of FIG. 14 and as shown in FIG. 9. In particular, the search radius value $d_0$ as well as the minimum distances for each signal bit group $d(1)$, $d(2)$, $d(3)$, and $d(4)$ are initially set to infinity. In addition, the path metric of the root node is set to zero, and the process starts at layer $L_4$ (e.g., as described in 1412 of FIG. 14). Node $N_2$ of layer $L_4$ may first be searched and its path metric may be determined to be 2 (e.g., as described in 1416 of FIG. 14). Next, nodes $N_4$ in layer $L_3$, $N_8$ in layer $L_4$, then $N_{16}$ in layer $L_1$ are searched and their path metrics are determined. Since the determined path metric of leaf node $N_{16}$ is less than the current search radius value $d_0$, and since $N_{16}$ is a leaf node corresponding to the first signal bit group, the minimum distance of the first signal bit group is updated, i.e., $d(1)$ is set to the path metric of $N_{16}$ (e.g., as described at 1422 of FIG. 14). The value of $d_0$ is still infinity because $d(2)$, $d(3)$, and $d(4)$ are still set to infinity. Next, leaf node $N_{17}$ is searched. Because the path metric of $N_{17}$ is less than the current search radius value $d_0$, and since $N_{17}$ is a leaf node corresponding to the second signal bit group, the minimum distance of the second signal bit group is updated, i.e., $d(2)$ is set to the path metric of $N_{17}$. Similarly, $d(3)$ is updated to the path metric of $N_{18}$ and $d(4)$ is updated to the path metric of $N_{19}$. After $d(4)$ is updated, the value of the search radius $d_0$ is updated to the maximum of $d(1)$, $d(2)$, $d(3)$, and $d(4)$, which in this example sets $d_0$ to $d(4)$=13 (e.g., as described at 1424 of FIG. 14). Next, the search continues as described at 1414-1432 and in FIG. 8, through nodes $N_5$, $N_{10}$, $N_{20}$, $N_{21}$, $N_{11}$, $N_3$, $N_6$, and $N_{12}$. Leaf node $N_{20}$ is removed because its path metric is greater than $d(1)$ (e.g., as described at 1422 of FIG. 14) and $N_{11}$ is removed because its path metric is greater than $d_0$ (e.g., as described at 1426 of FIG. 14).

At node $N_{24}$, $d(1)$ is updated to a new minimum value, i.e., $d(1)$ is set to the path metric of $N_{24}$, 9. At $N_{25}$, $d(2)$ is updated to a new minimum value, i.e., $d(2)$ is set to the path metric of $N_{25}$, 10. At $N_{26}$, $d(3)$ is updated to a new minimum value, i.e., $d(3)$ is set to the path metric of $N_{26}$, 11. Leaf node $N_{27}$ is removed since its path metric is greater than the current value of $d_0$, so $d(4)$ (and subsequently $d_0$) remain unchanged. Next, node $N_7$ is searched and removed because its path metric is equal to the current search radius value $d_0$, and the search finishes at $N_7$.

The four determined smallest distance metrics $d(1)$, $d(2)$, $d(3)$, and $d(4)$ can be used to compute LLRs for both soft streams $x_1$ and $x_2$. In particular, the smallest of a combination of the determined smallest distance metrics may be used to determine the smallest distance metric associated with each soft stream. In this example, $\min(d(1),d(3))$ corresponds to $$\min_{x \in X_{1,1}^{(0)}} \|y - Hx\|^2$$

whereas $\min(d(2),d(4))$ corresponds to $$\min_{x \in X_{1,1}^{(1)}} \|y - Hx\|^2,$$

where $X_{1,1}^{(b)}$ is the set of all possible data vectors $x$ with $b_{1,1}$=b. This is because signal bit groups 1 and 3 both correspond to $b_{1,1}$=0 (and to different $b_{2,1}$ values), while signal bit groups 2 and 4 both correspond to $b_{1,1}$=1 (and to different $b_{2,1}$ values). Similarly, $\min(d(1),d(2))$ corresponds to $$\min_{x \in X_{2,1}^{(0)}} \|y - Hx\|^2$$

whereas $\min(d(3),d(4))$ corresponds to $$\min_{x \in X_{2,1}^{(1)}} \|y - Hx\|^2.$$

Distance metrics $d(1)$, $d(2)$, $d(3)$, and $d(4)$ can therefore be used for calculating the LLRs of bits $b_{1,1}$ and $b_{2,1}$ in streams $x_1$ and $x_2$, respectively, as set forth in EQ. 6 above. The process thus visits ten leaf nodes to compute the LLRs of soft streams $x_1$ and $x_2$.

The soft sphere ML demodulation techniques described herein in connection with FIGS. 8, 9, 13, and 14 can achieve optimal LLR calculation. These soft sphere ML techniques may require more searches than hard-decision sphere decoding due to a larger search radius that takes bit grouping into account (e.g., eight leaf nodes are visited in the example of FIG. 8 instead of six leaf nodes in the example of FIG. 7). However, this additional complexity (e.g., as measured by the number of leaf nodes searched) allows to compute soft information and to preserve optimal performance. It should be noted that the complexity of the system varies according to the selected number, $S_{so}$, of soft signal streams. The more streams selected for soft decoding, the more complex the system is (i.e., the more nodes that are required to be searched).

In some embodiments, the number $S_{so}$ of soft streams is controllable. This allows partial stream LLR computation which may be sufficient for the purposes of some applications. For example, in multiuser MIMO networks, multiple users are scheduled to simultaneously share a channel. Partial stream LLR computation (e.g., computing LLRs for only a subset $S_{so}$ of the transmitted data vector) may be sufficient to recover the user information for a subset of users.

In some embodiments, the search space may be modified such that only nodes that correspond to a signal bit group (e.g., to a bit index) are kept in the tree. Other nodes that do not correspond to the same signal bit group (e.g., counter-bit nodes) are removed from the tree. Each tree may then be separately searched for a smallest distance metric.

Figure 15:
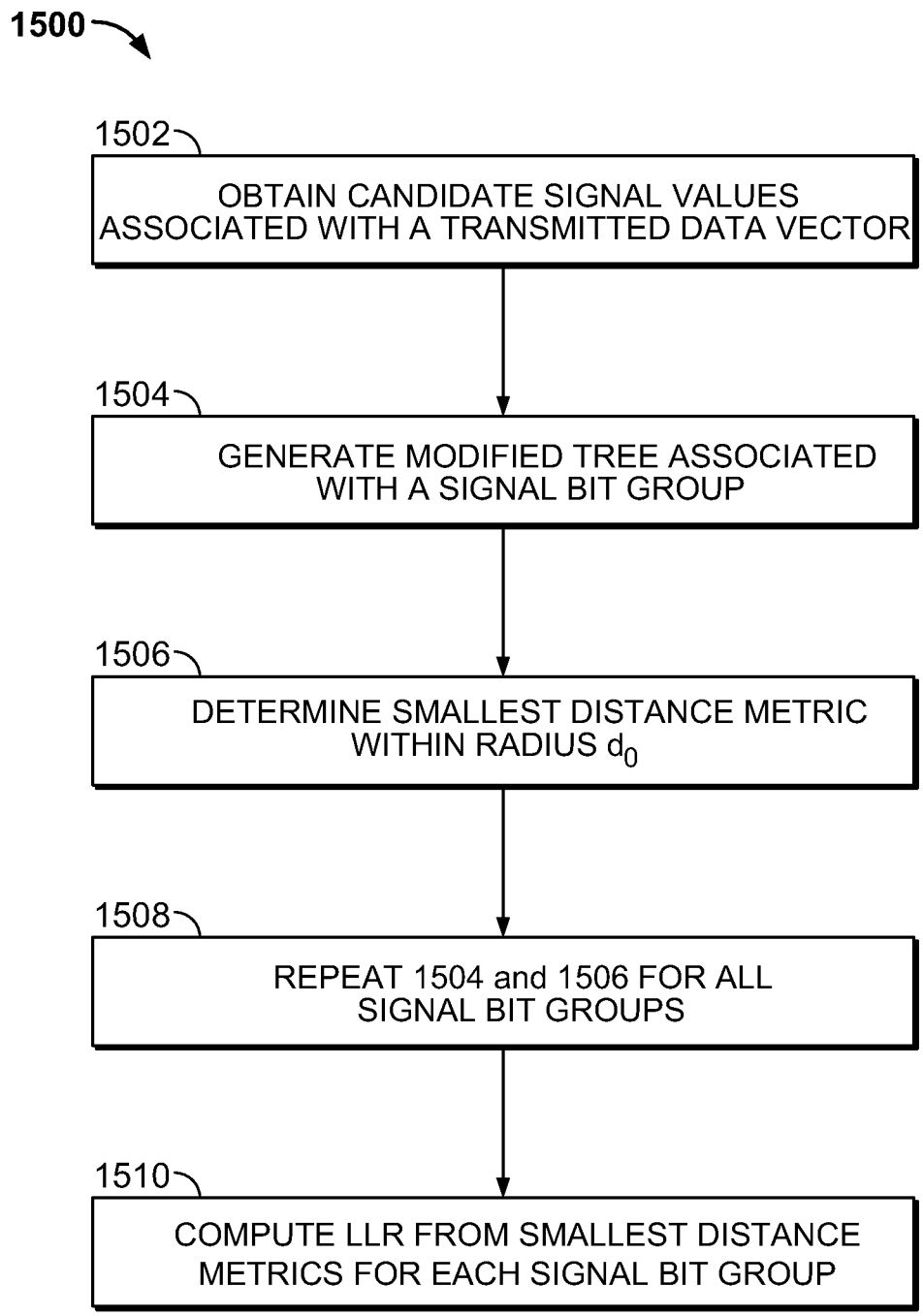
FIG. 15 shows a flowchart of a process for computing soft information for a transmitted data vector using a modified tree search in accordance with some embodiments.

FIG. 15 shows a flowchart of process 1500 for computing soft information for a transmitted data vector using a modified tree search in accordance with some embodiments. Process 1500 may be performed to output a log-likelihood ratio (LLR) associated with a data vector x having S signal streams each of width W bits. Process 1500 may be implemented using, e.g., soft-decision block 514 of FIG. 5. Process 1500 includes 1502, 1504, 1506, 1508, and 1510.

At 1502, candidate signal values associated with the transmitted data vector x are obtained. For example, all or a subset of all candidate data vectors with S signal streams of width W bits may be determined.

At 1504, a first modified tree associated with a first signal bit group is generated. As described above, a signal bit group corresponds to a group of candidate signal values having the same signal value or values for one or more signal streams. The modified tree generated at 1504 may only represent the candidate signal values associated with candidate data vectors belonging to the first signal bit group. Examples of these modified trees may be found in FIGS. 10A, 10B, 11A, 11B, 12A, and 12B.

At 1506, a sphere search within a dynamically updated search radius $d_0$ is performed on the tree generated at 1504 to find the leaf node with the smallest distance metric. The sphere search may proceed similarly to FIGS. 6 and 7, except that the modified tree contains only those nodes that correspond to one signal bit group. The identified leaf node with the smallest distance metric may be stored using, e.g., a memory storage unit (not shown) in the soft-decision block 514 of FIG. 5.

At 1508, both 1504 and 1506 may be repeated for each signal bit group corresponding to the candidate signal values, these groups having been determined at 1502. For example, a second modified tree may be generated that only represents the candidate signal values associated with candidate data vectors belonging to a second different signal bit group.

At 1510, an LLR for each bit of the soft signal streams may be computed from the smallest distance metrics determined in each modified tree. For example, in the case of two modified trees, the smallest distance determined in the first modified tree may correspond to $$\min_{x \in X_{s,n}^{(0)}} \|y - Hx\|^2$$

whereas the smallest distance determined in the second modified tree may correspond to $$\min_{x \in X_{s,n}^{(1)}} \|y - Hx\|^2,$$

where $X_{s,n}^{(b)}$ is the set of all possible data vectors x with $b_{s,n}=b$. The smallest distance metrics determined in each modified tree can therefore be used for calculating the LLR of $b_{s,n}$ of signal stream $x_s$ as set forth in EQ. 6 above. Process 1500 will be graphically illustrated in FIGS. 10A, 10B, 11A, 11B, 12A, and 12B below.

Figure 10A:
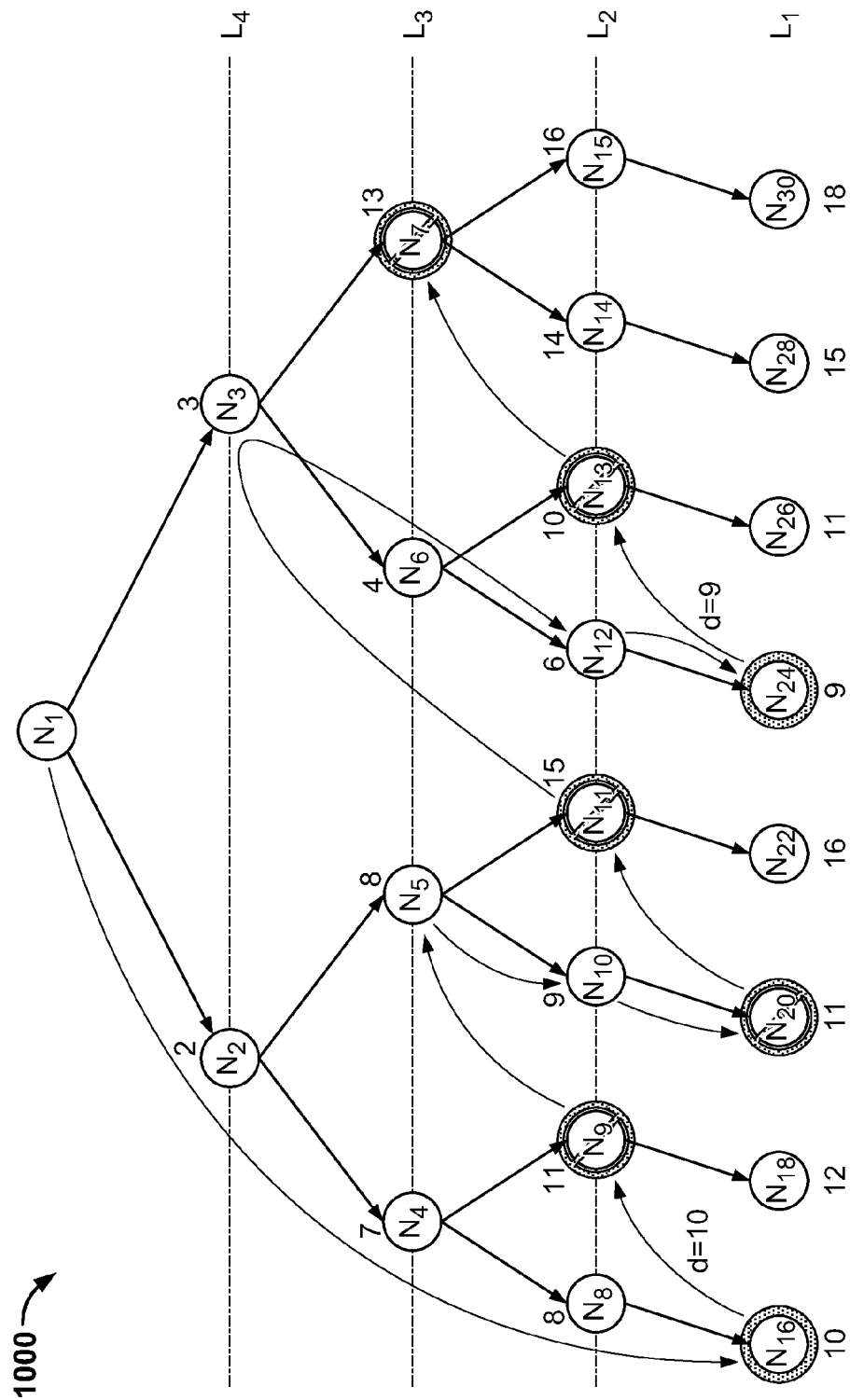
FIGS. 10A, 10B, 11A, 11B, 12A, and 12B graphically illustrate a process for soft sphere ML demodulation using a modified search tree in a 2 QAM/BPSK modulation scheme with four signal streams, one of which is selected for soft decoding in accordance with some embodiments.
Figure 10B:
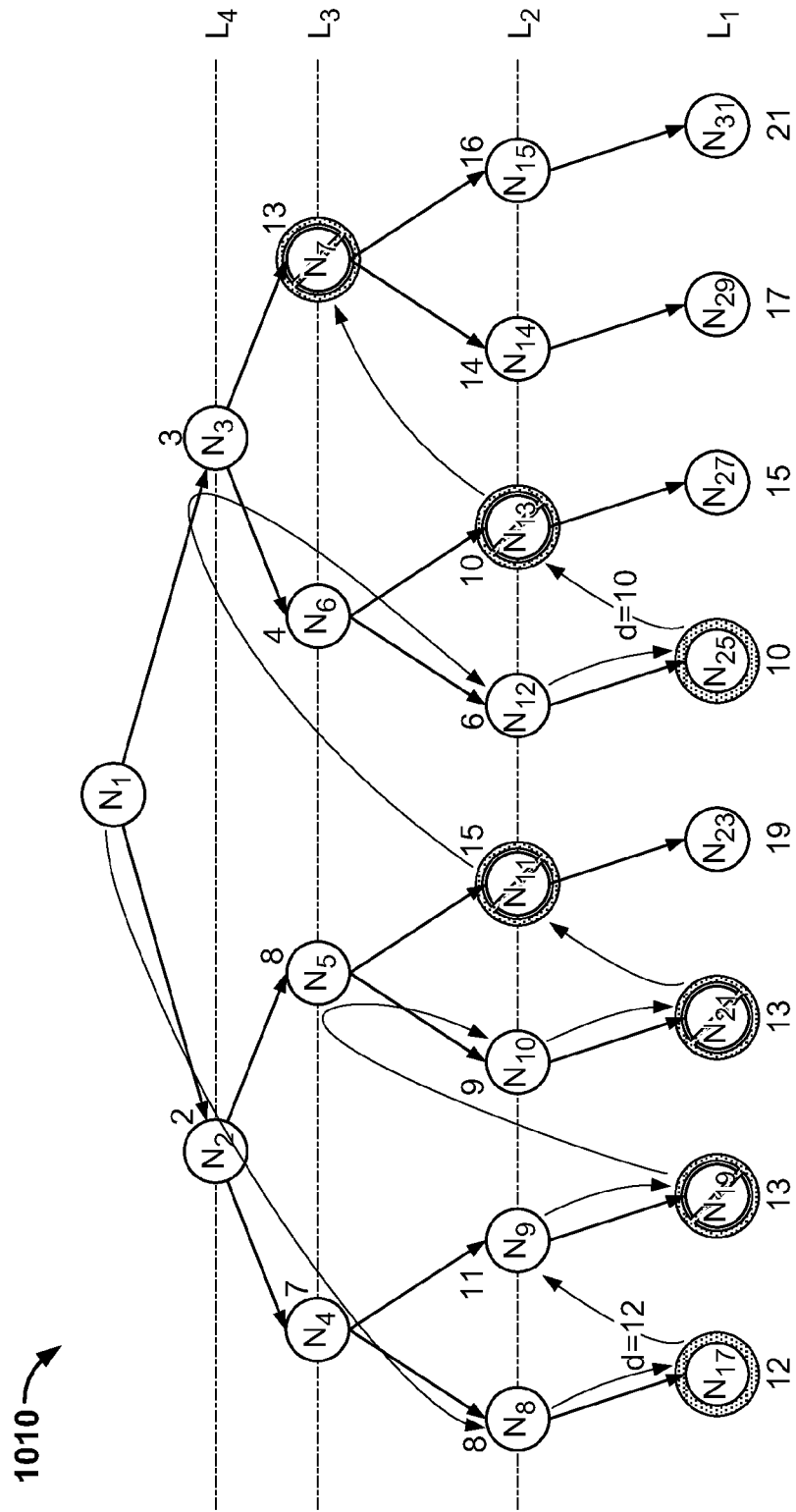

FIGS. 10A and 10B graphically illustrate process 1500 of FIG. 15 for ML demodulation using soft sphere decoding in a 2 QAM/BPSK modulation scheme (i.e., W=1) where S=4 and $S_{so}=1$ (i.e., one signal stream, $x_1$, is selected for soft decoding) in accordance with some embodiments.

FIG. 10A illustrates a first modified binary tree 1000 corresponding to a first signal bit group. Tree 1000 may represent all candidate signal values corresponding to candidate data vectors with $b_{1,1}=0$ (e.g., as described at 1504 of FIG. 15). For example, only even-numbered leaf nodes are represented in tree 1000 compared to trees of FIGS. 7, 8, and 9. In some embodiments, modified tree 1000 is searched for a leaf node with a smallest distance metric.

For example, a sphere search within a dynamically updated search radius value $d_0$ may be used to find the leaf node with the smallest distance metric for the first signal bit group. The sphere search may proceed similarly to FIG. 7 in layers $L_4$, $L_3$, and $L_2$, except that modified tree 1000 contains only those leaf nodes in layer $L_1$ that correspond to the first signal bit group. At the end of the search, $N_{24}$ is determined to be the leaf node with the smallest distance metric.

FIG. 10B illustrates a second modified binary tree 1010 corresponding to a second signal bit group. Tree 1010 may represent all candidate signal values corresponding to candidate data vectors with $b_{1,1}=1$ (i.e., the second signal bit group). In particular, only odd-numbered leaf nodes are represented in tree 1010 compared to the trees used in FIGS. 7, 8, and 9. Like tree 1000, tree 1010 is searched for a leaf node with a smallest distance metric using, for example, a sphere search within a dynamically updated search radius value $d_0$. At the end of the search, $N_{25}$ is determined to be the leaf node with the smallest distance metric. The smallest distance determined in the first modified tree corresponds to $$\min_{x \in X_{1,1}^{(0)}} \|y - Hx\|^2$$

whereas the smallest distance determined in the second modified tree corresponds to $$\min_{x \in X_{1,1}^{(1)}} \|y - Hx\|^2,$$

where $X_{1,1}^{(b)}$ is the set of all possible data vectors x with $b_{1,1}=b$. The smallest distance metrics determined in each modified tree can therefore be used for calculating the LLR of $b_{1,1}$ of signal stream $x_1$ as set forth in EQ. 6 above.

In the illustrative example of FIGS. 10A and 10B, finding the smallest distance metric for the first signal bit group requires three leaf node visits (i.e., $N_{16}$, $N_{20}$, and $N_{24}$ in modified tree 1000), whereas finding the smallest distance metric for the second signal bit group requires four leaf node searches (i.e., $N_{17}$, $N_{19}$, $N_{21}$ and $N_{25}$ in modified tree 1010). In other words, computing the LLR for the bit of signal stream $x_1$ in the example of FIGS. 10A and 10B requires two modified tree searches and seven leaf node visits. These tree searches may be run in parallel, and each search needs only keep track of one current best leaf node and one current search radius value $d_0$.

In some embodiments, process 1500 may be used to compute the LLRs for a second set of soft signal streams $S_{so}'$ by appropriately reordering the signal streams of transmitted data vector x such that the new selected soft signal streams are the first signal streams in the reordered transmitted data vector. This reordering would allow the second set of soft signal streams to correspond to bottom layers in a binary tree representation of all candidate data vectors. As described above, this reordering may be achieved by multiplying x, y, and H with appropriate permutation matrices. The same processes 1500 may then be applied to the reordered $x^p$ to compute soft information for the second set of soft signal streams.

Figure 11A:
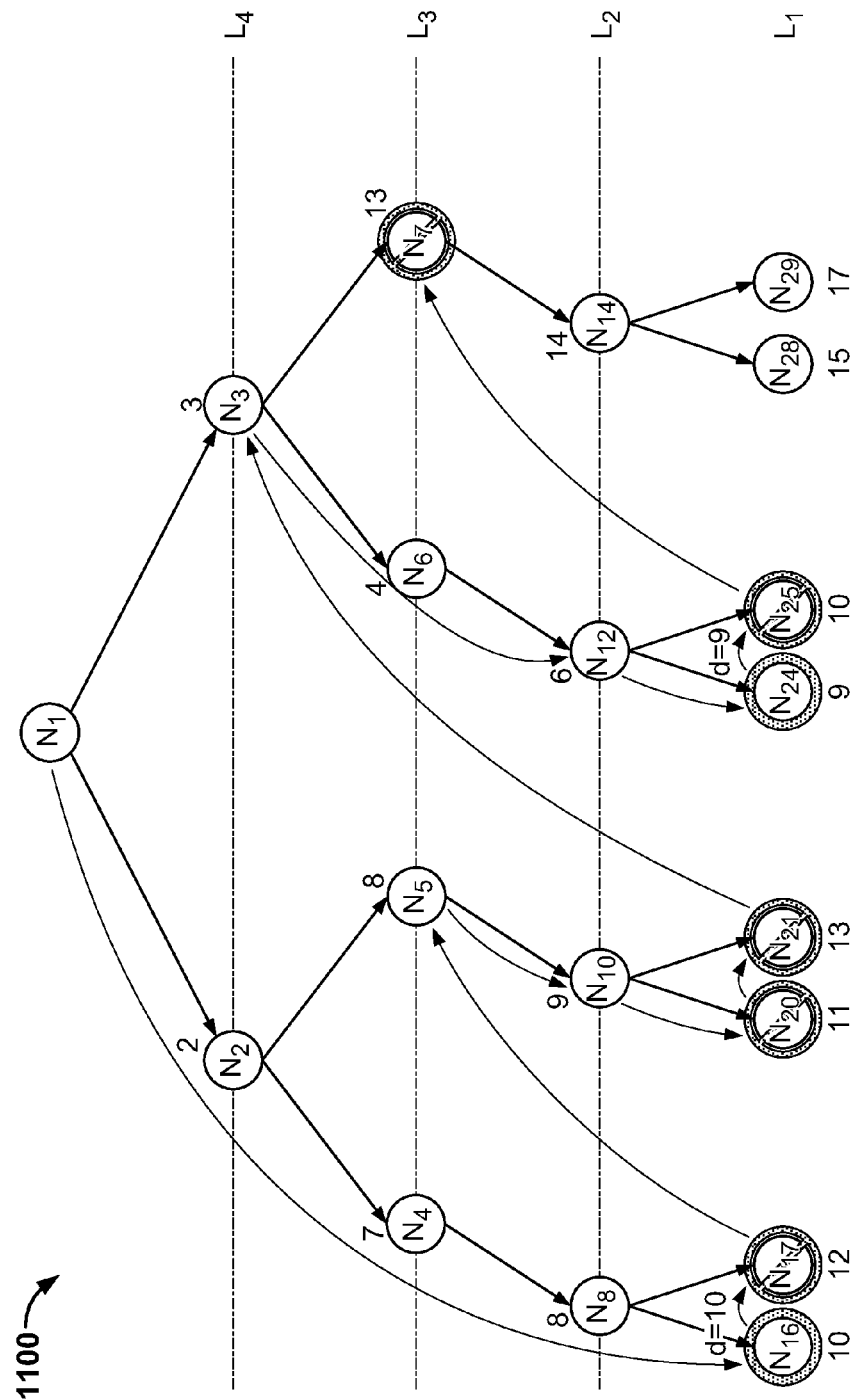
Figure 11B:
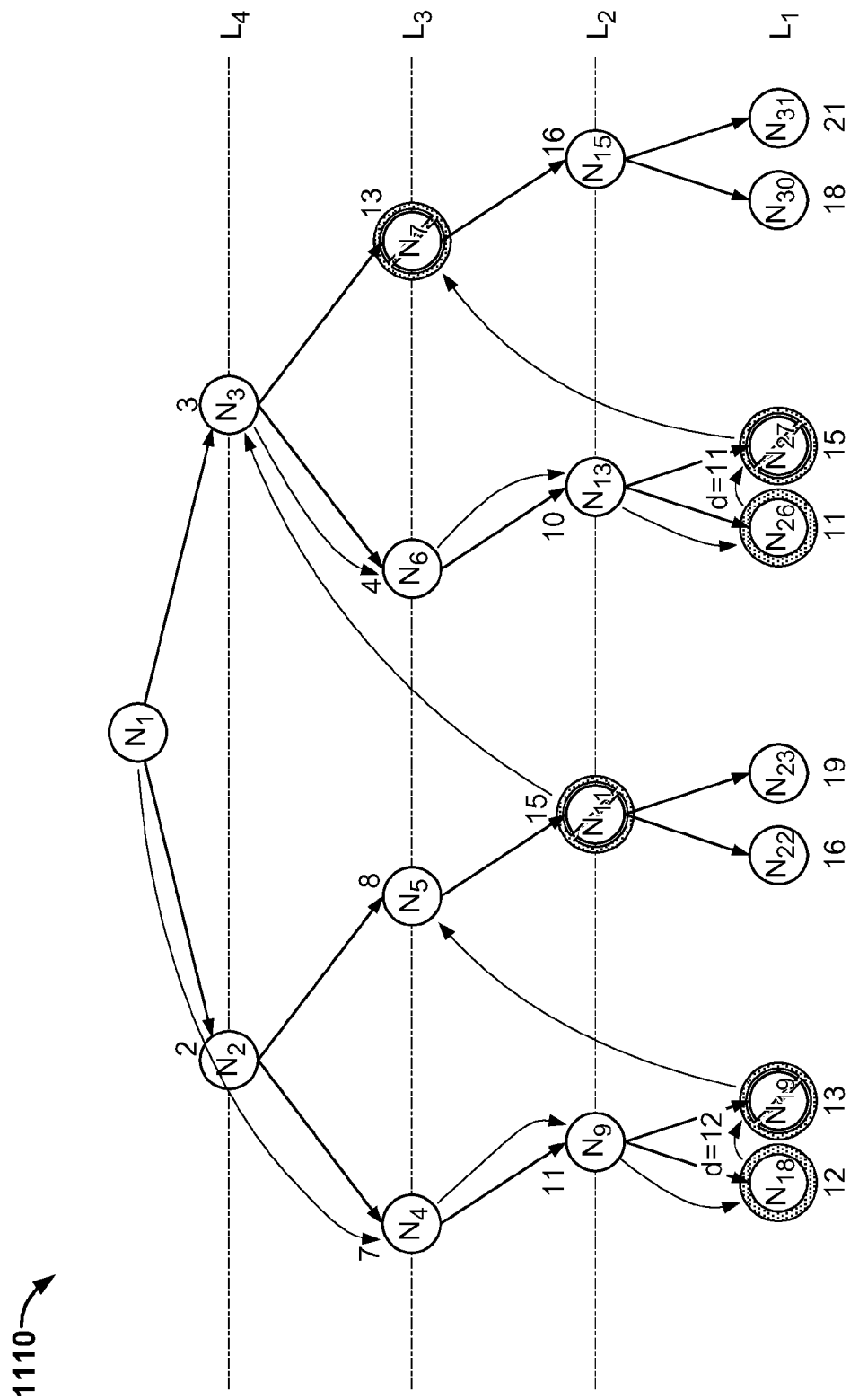
Figure 12A:
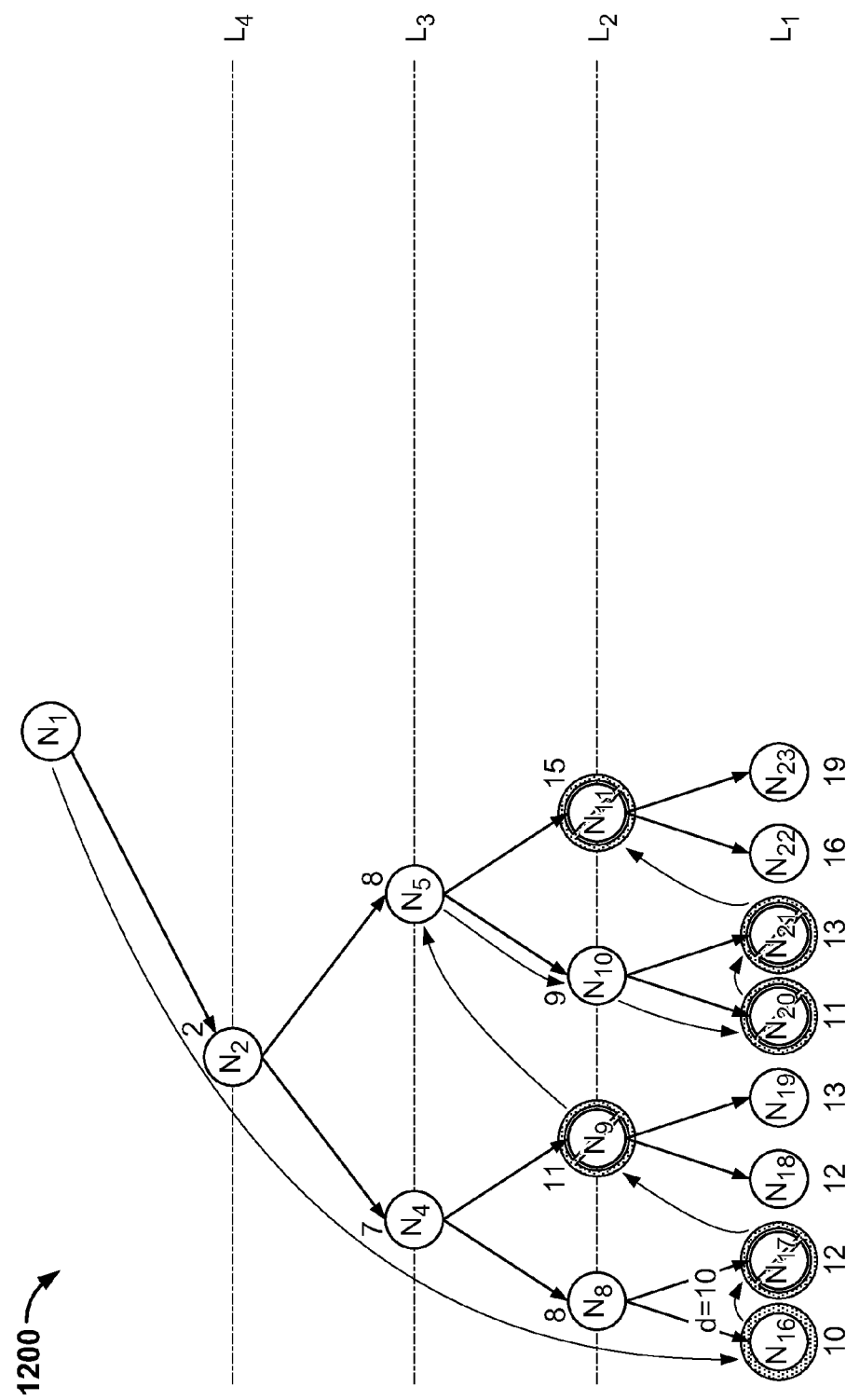
Figure 12B:
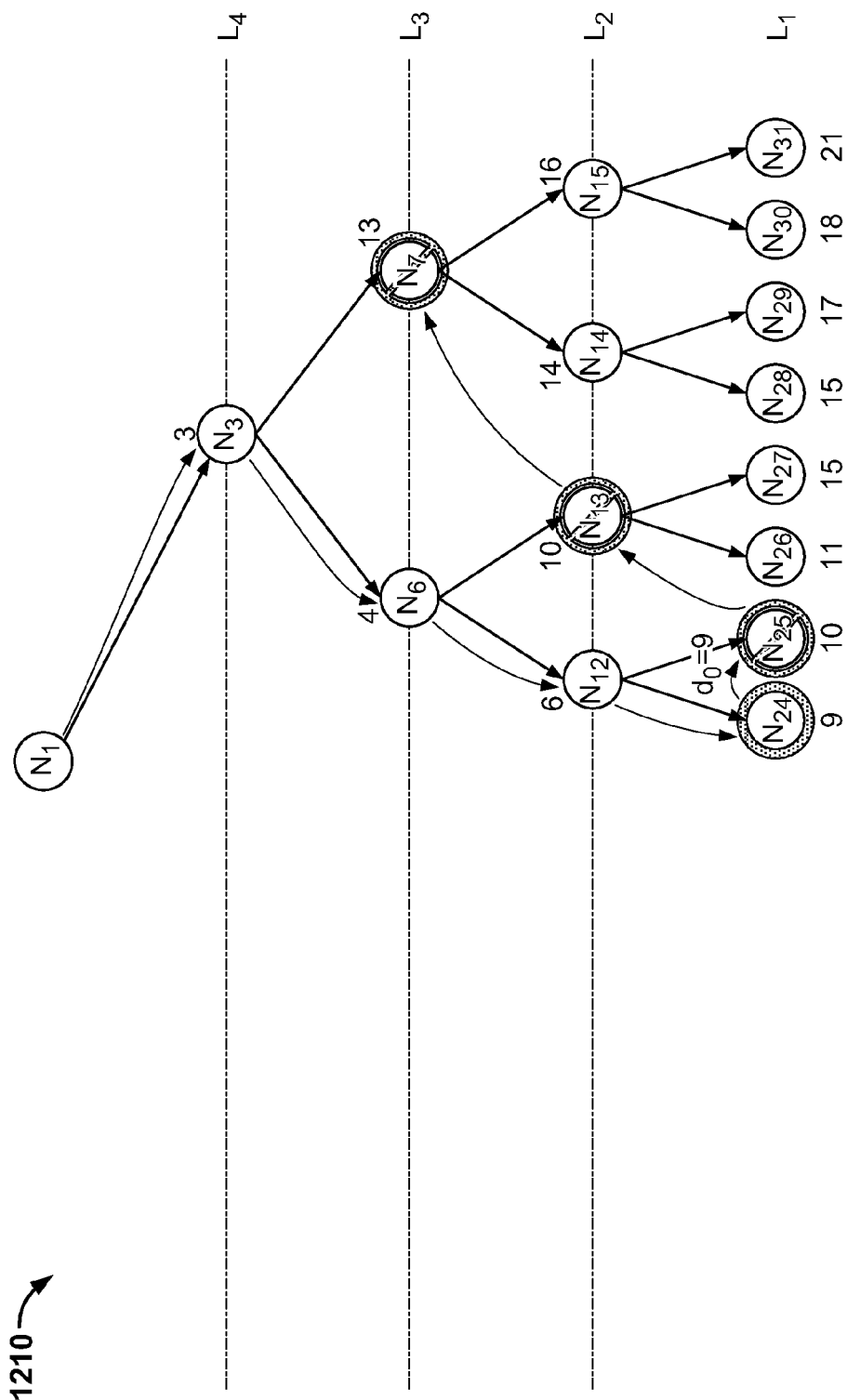

In some embodiments, process 1500 may be used to compute the LLRs for a second set of soft signal streams $S_{so}'$ by generating a new set of modified trees such that only nodes that correspond to one signal value of the second set of soft signal streams are kept in each modified tree. FIGS. 11A and 11B illustrate this technique for computing the LLR for signal stream $x_2$ in accordance with some embodiments. FIGS. 12A and 12B illustrate this technique for computing the LLR for signal stream $x_4$ in accordance with some embodiments. Similar techniques may be used to compute the LLR for signal stream $x_3$.

FIG. 11A illustrates a first modified binary tree 1100 corresponding to a first signal bit group for computing the LLR for signal stream $x_2$. Tree 1100 represents all candidate signal values corresponding to candidate data vectors with $b_{2,1}=0$ (i.e., the first signal bit group). For example, only even-numbered nodes in layer $L_2$ corresponding to stream $x_2$ (and the children nodes of these even-numbered nodes of $L_2$) are represented in tree 1100. Modified tree 1100 may be searched for a leaf node with a smallest distance metric. For example, a sphere search within a dynamically updated search radius value $d_0$ may be used to find the smallest distance metric for the first signal bit group. The sphere search may proceed similarly to FIG. 7 in layers $L_4$, and $L_3$, except that modified tree 1100 contains only those nodes in layers $L_2$ and $L_1$ that correspond to the first signal bit group. At the end of the search, $N_{24}$ is determined to be the leaf node with the smallest distance metric.

FIG. 11B illustrates a second modified binary tree 1110 corresponding to a second signal bit group for computing the LLR for signal stream $x_2$. Tree 1110 may represent all candidate signal values corresponding to candidate data vectors with $b_{2,1}=1$ (i.e., the second signal bit group). In particular, only odd-numbered nodes in layer $L_2$ corresponding to signal stream $x_2$ (and the children nodes of these odd-numbered nodes of $L_2$) are represented in tree 1010. Like tree 1100, tree 1110 is searched for a leaf node with a smallest distance metric using, for example, a sphere search within a dynamically updated search radius value $d_0$. At the end of the search, $N_{26}$ is determined to be the leaf node with the smallest distance metric.

In the illustrative example of FIGS. 11A and 11B, finding the smallest distance metric for the first signal bit group requires six leaf node searches (i.e., $N_{16}$, $N_{17}$, $N_{20}$, $N_{21}$, $N_{24}$, and $N_{25}$ in modified tree 1100), whereas finding the smallest distance metric for the second signal bit group requires four leaf node searches (i.e., $N_{18}$, $N_{19}$, $N_{26}$, and $N_{27}$ in modified tree 1010). In other words, computing the LLR for the bit of signal stream $x_1$ requires two modified tree searches and ten leaf node visits.

FIG. 12A illustrates a first modified binary tree 1200 corresponding to a first signal bit group for computing the LLR for signal stream $x_4$. Tree 1200 represents all candidate signal values corresponding to candidate data vectors with $b_{4,1}=0$ (i.e., the first signal bit group). For example, only nodes that descend (directly or indirectly) from $N_2$ are represented in tree 1200. Modified tree 1200 may be searched for a leaf node with a smallest distance metric using, for example, a sphere search within a dynamically updated search radius value $d_0$. The sphere search may proceed similarly to FIG. 7, except that modified tree 1200 contains only those nodes that correspond to the first signal bit group. At the end of the search, $N_{16}$ is determined to be the leaf node with the smallest distance metric.

FIG. 12B illustrates a second modified binary tree 1210 corresponding to a second signal bit group for computing the LLR for signal stream $x_4$. Tree 1110 may represent all candidate signal values corresponding to candidate data vectors with $b_{4,1}=1$ (i.e., the second signal bit group). In particular, only nodes that descend (directly or indirectly) from $N_3$ are represented in tree 1210. Modified tree 1210 may be searched for a leaf node with a smallest distance metric using, for example, a sphere search within a dynamically updated search radius value $d_0$. The sphere search may proceed similarly to FIG. 7, except that modified tree 1200 contains only those nodes that correspond to the second signal bit group. At the end of the search, $N_{24}$ is determined to be the leaf node with the smallest distance metric.

In the illustrative example of FIGS. 12A and 12B, finding the smallest distance metric for the first signal bit group requires four leaf node searches (i.e., $N_{16}$, $N_{17}$, $N_{20}$, and $N_{21}$ in modified tree 1200), whereas finding the smallest distance metric for the second signal bit group requires two leaf node searches (i.e., $N_{24}$ and $N_{25}$ in modified tree 1210). In other words, computing the LLR for the bit of signal stream $x_4$ requires two modified tree searches and six leaf node visits.

Like the soft sphere ML demodulation techniques described in FIGS. 8, 9, 13, and 14, the embodiments described in FIGS. 10A, 10B, 11A, 11B, 12A, 12B, and 15 can also achieve optimal LLR calculation. This approach may require more searches than hard sphere decoding because of multiple tree searches, e.g., 2S times for S streams when using two modified trees. However, modified trees may be searched in parallel to reduce latency and processing times. These techniques lower complexity of the existing exhaustive soft ML demodulation method while preserving optimal performance. These techniques may also be used for partial stream LLR calculation, for example, for multiuser MIMO applications.

The foregoing description of exemplary embodiments provides illustration and description, but is not intended to be exhaustive or to limit the present disclosure to the precise form disclosed. Modifications and variations are possible in light of the above teachings or may be acquired from practice of the present disclosure. For example, it should be understood that the above steps of processes 1300, 1400, and 1500 may be executed or performed in any order or sequence not limited to the order and sequence shown and described in the figure. Also, some of the above steps of processes may be executed or performed substantially simultaneously where appropriate or in parallel to reduce latency and processing times. FIGS. 7, 8, 9, 10A, 10B, 11A, 11B, 12A, and 12B illustrate examples of soft or hard sphere ML demodulation using a 2 QAM/BPSK modulation scheme with S=4 and $S_{so}=1$ or 2. These examples are presented for the purpose of illustration rather than of limitation. Those skilled in the art will appreciate that the same techniques may be applied to other modulation schemes and different numbers of signal streams and soft streams. Moreover, any of the components of the described systems may be modified, omitted, or rearranged, or any additional components may be added, without departing from the scope of the present disclosure. Furthermore, any of the components may be combined into a component with combined functionality. While certain components of the present disclosure have been described as implemented in hardware and others in software, other configurations may be possible.

The foregoing describes systems and methods for MIMO soft-decision maximum likelihood demodulation. Those skilled in the art will appreciate that the disclosed methods and apparatus can be practiced by other than the described embodiments, which are presented for the purpose of illustration rather than of limitation.

What is claimed is:
1. A method for decoding a data vector by a processor, the method comprising:
 partitioning candidate signal values of the data vector into at least a first partition and a second partition, wherein candidate signal values in the first partition have a same, first symbol value at a particular symbol position, and candidate signal values in the second partition have a same, second symbol value at the particular symbol position;
 determining a maximum radius value of a first radius associated with the first partition and a second radius associated with the second partition;
 generating a representation of the plurality of candidate signal values, wherein the representation comprises a first portion representing the first partition and a second portion representing the second partition; and performing a search based on the generated representation of the candidate signal values and the maximum radius value to compute decoding information for the data vector.

2. The method of claim 1, further comprising grouping elements of the generated representation into the first portion and the second portion.

3. The method of claim 1, wherein the performed search is a sphere search, the method further comprising updating the first radius associated with the first partition and updating the second radius associated with the second partition.

4. The method of claim 3, further comprising:
updating the first radius for the first partition based on a first distance metric; and
updating the second radius for the second partition based on a second distance metric.

5. The method of claim 1, wherein the generated representation comprises a tree, and wherein the candidate signal values in the first partition are represented by a first group of leaf nodes of the tree, and the candidate signal values in the second partition are represented by a second group of leaf nodes of the tree.

6. The method of claim 1, further comprising selecting a first set of signal streams of the data vector, wherein each partition of the at least first and second partition corresponds to a different candidate signal value of the first set of signal streams.

7. The method of claim 6, further comprising performing soft-decision decoding on the first set of signal streams of the data vector.

8. The method of claim 7, further comprising performing hard-decision decoding on a second set of signal streams of the data vector.

9. The method of claim 1, wherein the data vector is modulated based on a Gray code mapping.

10. A system for decoding a data vector, the system comprising:
demodulating circuitry configured to:
partition candidate signal values of the data vector into at least a first partition and a second partition, wherein candidate signal values in the first partition have a same, first symbol value at a particular symbol position, and candidate signal values in the second partition have a same, second symbol value at the particular symbol position;
determine a maximum radius value of a first radius associated with the first partition and a second radius associated with the second partition;
generate a representation of the plurality of candidate signal values, wherein the representation comprises a first portion representing the first partition and a second portion representing the second partition; and
perform a search based on the generated representation of the candidate signal values and the maximum radius value to compute decoding information for the data vector.

11. The system of claim 10, further comprising a decoder configured to decode the data vector based on the computed decoding information.

12. The system of claim 10, wherein the demodulating circuitry is further configured to group elements of the generated representation into the first portion and the second portion.

13. The system of claim 10, wherein the performed search is a sphere search, and wherein the demodulating circuitry is further configured to update the first radius associated with the first partition and update the second radius associated with the second partition.

14. The system of claim 13, wherein the demodulating circuitry is further configured to:
update the first radius for the first partition based on a first distance metric; and
update the second radius for the second partition based on a second distance metric.

15. The system of claim 10, wherein the generated representation comprises a tree, and wherein the candidate signal values in the first partition are represented by a first group of leaf nodes of the tree, and the candidate signal values in the second partition are represented by a second group of leaf nodes of the tree.

16. The system of claim 10, wherein the demodulating circuitry is further configured to select a first set of signal streams of the data vector, wherein each partition of the at least first and second partition corresponds to a different candidate signal value of the first set of signal streams.

17. The system of claim 16, wherein the demodulating circuitry comprises soft-decision demodulating circuitry configured for performing soft-decision decoding on the first set of signal streams of the data vector.

18. The system of claim 17, further comprising a hard-decision demodulating circuitry configured to perform hard-decision decoding on a second set of signal streams of the transmitted data vector.

19. The system of claim 10, wherein the data vector is modulated based on a Gray code mapping.

20. The system of claim 10, wherein the decoding information comprises one of soft information and hard information.

* * * * *